(12) United States Patent
Fung et al.

(10) Patent No.: US 11,048,018 B2
(45) Date of Patent: Jun. 29, 2021

(54) SYSTEMS, METHODS, AND COMPUTER-READABLE MEDIA FOR MODELING COMPLEX WELLBORES IN FIELD-SCALE RESERVOIR SIMULATION

(71) Applicant: Saudi Arabian Oil Company, Dhahran (SA)

(72) Inventors: Larry Siu-Kuen Fung, Dhahran (SA); Xiang Yang Ding, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 425 days.

(21) Appl. No.: 15/914,283

(22) Filed: Mar. 7, 2018

(65) Prior Publication Data

US 2018/0196162 A1    Jul. 12, 2018

Related U.S. Application Data

(62) Division of application No. 14/171,815, filed on Feb. 4, 2014, now abandoned.

(Continued)

(51) Int. Cl.
    *G01V 99/00*        (2009.01)
    *E21B 41/00*        (2006.01)

(52) U.S. Cl.
    CPC .......... *G01V 99/005* (2013.01); *E21B 41/00* (2013.01); *G01V 2210/624* (2013.01)

(58) Field of Classification Search
    CPC . G01V 99/005; G01V 2210/624; E21B 41/00

(Continued)

(56) References Cited

U.S. PATENT DOCUMENTS 5,740,342 A    4/1998    Kocberber
5,850,560 A    12/1998   Kang
(Continued)

FOREIGN PATENT DOCUMENTS

CA    2803144 A1    12/2011
WO    2008150325 A1    12/2008
(Continued)

OTHER PUBLICATIONS

Answers.com; "computation" available as of May 13, 2019 at: https://web.archive.org/web/20050428134808/http://www.answers.com/topic/computation; pp. 1-6.

(Continued)

*Primary Examiner* — Hai Tao Sun
(74) *Attorney, Agent, or Firm* — Bracewell LLP; Constance G. Rhebergen; Brian H. Tompkins

(57) ABSTRACT

Systems, methods, and computer-readable media are provided for a near-well unstructured grid model builder for generating a full-field unstructured grid for reservoir simulation. As described further below, the near-well unstructured grid model builder may include a workflow interface and a parallel unstructured grid model builder. The inputs to the near-well unstructured grid model builder may include existing well trajectory and completion data, future well data, a geological model, a structured grid simulation model, or any combination thereof. The near-well unstructured grid model builder may output a near-well unstructured grid having a specified grid resolution in regions of interest that include a well.

4 Claims, 37 Drawing Sheets

Related U.S. Application Data

(60) Provisional application No. 61/766,056, filed on Feb. 18, 2013.

(58) Field of Classification Search
USPC .......................................................... 345/440
See application file for complete search history.

(56) References Cited

U.S. PATENT DOCUMENTS

| | | | |
|---|---|---|---|
| 6,018,497 | A | 1/2000 | Gunasekera |
| 6,078,869 | A * | 6/2000 | Gunasekera ............. G01V 1/48 |
| | | | 702/6 |
| 6,106,561 | A | 8/2000 | Farmer |
| 6,907,392 | B2 | 6/2005 | Bennis |
| 7,047,165 | B2 | 5/2006 | Balaven et al. |
| 7,277,836 | B2 | 10/2007 | Netemeyer et al. |
| 7,451,066 | B2 | 11/2008 | Edwards et al. |
| 7,634,395 | B2 | 12/2009 | Flandrin |
| 7,809,537 | B2 | 10/2010 | Hemanthkumar et al. |
| 7,932,904 | B2 | 4/2011 | Branets et al. |
| 8,212,814 | B2 | 7/2012 | Branets et al. |
| 8,214,187 | B2 | 7/2012 | Mouton et al. |
| 8,301,429 | B2 | 10/2012 | Hajibeygi et al. |
| 8,386,227 | B2 | 2/2013 | Fung et al. |
| 8,433,551 | B2 | 4/2013 | Fung et al. |
| 8,463,586 | B2 | 6/2013 | Mezghani et al. |
| 2001/0006387 | A1 | 7/2001 | Bennis et al. |
| 2002/0038201 | A1 | 3/2002 | Balaven et al. |
| 2006/0235666 | A1 | 10/2006 | Assa et al. |
| 2007/0073527 | A1 | 3/2007 | Flandrin et al. |
| 2010/0094597 | A1* | 4/2010 | Blain ...................... G06F 30/23 |
| | | | 703/1 |
| 2010/0128041 | A1 | 5/2010 | Branets et al. |
| 2010/0217574 | A1 | 8/2010 | Usadi et al. |
| 2011/0169838 | A1 | 7/2011 | Branets et al. |
| 2011/0313745 | A1* | 12/2011 | Mezghani ........ G06K 19/07345 |
| | | | 703/10 |
| 2012/0059639 | A1 | 3/2012 | Fung et al. |
| 2012/0179436 | A1 | 7/2012 | Fung |
| 2012/0232859 | A1 | 9/2012 | Pomerantz et al. |
| 2013/0096889 | A1 | 4/2013 | Khvoenkova et al. |
| 2014/0236559 | A1 | 8/2014 | Fung et al. |
| 2015/0260016 | A1 | 9/2015 | Fung et al. |
| 2015/0260017 | A1 | 9/2015 | Ding |

FOREIGN PATENT DOCUMENTS

| | | |
|---|---|---|
| WO | 2011163166 A2 | 12/2011 |
| WO | 2012033650 A2 | 3/2012 |
| WO | 2012033693 A2 | 3/2012 |
| WO | 2014126959 A2 | 8/2014 |

OTHER PUBLICATIONS

Coats, K.H. "Reservoir Simulation" Petroleum Engineering Handbook, Chapter 48, 1987; pp. 1-20.
Google; "define computational" available as of May 9, 2019 at: https://www.google.com/search?q=define+computational&riz=1C1GCEU_enUS820US820&oq=define+aqs=chrome; pp. 1-2.
Branets, Larisa V. et al.; "Challenges and Technologies in Reservoir Modeling" Communications in Computational Physics, Jul. 2009, vol. 6, No. 1, pp. 1-23.
Japanese Office Action dated Dec. 4, 2017 for corresponding Japanese Patent Application No. 2016-557914 (SA5263/JP); pp. 1-3.
Japanese Office Action dated Nov. 8, 2017 for corresponding Japanese application No. 2016-558139 (SA5262/JP); pp. 1-3.
Dictonary.com "Parallel" available as of Mar. 16, 2017 at <http://www.dictionary.com/browse/parallel>; p. 1.
Dogru, Ali H. et al.; "A Next-Generation Parallel Reservoir Simulator for Giant Reservoirs" SPE 119272, SPE Reservoir Simulation Symposium, The Woodlands, TX, Feb. 2-4, 2009; pp. 1-29.
Dogru, Ali H. et al.; "New Frontiers in Large Scale Reservoir Simulation" SPE 142297, SPE Reservoir Simulation Symposium, The Woodlands, TX, Feb. 21-23, 2011; pp. 1-12.
Edwards, Michael G.; "Unstructured, control-volume distributed, full-tensor finite-volume schemes with flow based grids" Computational Geosciences, vol. 6 (2002), pp. 433-452.
English Translation of Japanese Office Action dated Dec. 4, 2017 for corresponding Japanese Patent Application No. 2016-557914 (SA5263/JP); pp. 1-3.
English Translation of Japanese Office Action dated Nov. 8, 2017 for corresponding Japanese Patent Application No. 2016-558139 (SA5262/JP); pp. 1-3.
Fung, Larry S. K. et al.; "An Unstructured Gridding Method for Densely-Spaced Complex Wells in Full-Field Reservoir Simulation", SPE 163648, SPE Reservoir Simulation Symposium, The Woodlands, TX, Feb. 18-20, 2013, pp. 1-13.
Fung, Larry S. K. et al.; "Distributed Unstructured Grid Infrastructure for Complex Reservoir Simulation" SPE 113906, SPE EUROPEC/EAGE Annual Conference and Exhibition, Rome, Italy, Jun. 9-12, 2008, pp. 1-9.
Fung, Larry S. K. et al.; "Using Unstructured Grids for Modeling Densely-Spaced Complex Wells in Field-Scale Reservoir Simulation" IPTC 17062, International Petroleum Technology Conference, Beijing, China, Mar. 26-28, 2013, pp. 1-14.
Heinemann et al.; "Gridding Techniques in Reservoir Simulation" XP-002741071; Proc. First Intl. Forum on Reservoir Simulation, Alpbach, 1988, pp. 339-425.
Heinemann, Z. E. et al; "Modeling Heavily Faulted Reservoirs" SPE 48998, SPE Annual Technical Conference and Exhibition, New Orleans, LA, Sep. 27-30, 1998, pp. 1-11.
International Search Report and Written Opinion for PCT/US2014/015935 (SA5125PCT) dated Jul. 1, 2015; pp. 1-14.
International Search Report and Written Opinion for PCT/US2015/020677 (SA5262/PCT) dated Jan. 26, 2016; pp. 1-16.
International Search Report and Written Opinion for PCT/US2015/020690 (SA5263PCT) dated Jul. 15, 2015; pp. 1-12.
Karimi-Fard, M. et al.; "An Expanded Well Model for Accurate Simulation of Well-Reservoir Interaction" SPE 141675, SPE Reservoir Simulation Symposium, The Woodlands, TX, Feb. 21-23, 2011; pp. 1-12.
Katzmayr et al.; "An Iterative Algorithm for Generating Constrained Voronoi Grids" SPE 118942, SPE Reservoir Simulation Symposium, The Woodlands, Texas, Feb. 2-4, 2009, pp. 1-11.
Matijevic et al.; "Modeling Faults in Reservoir Simulation" 4th European Conference on the Mathematics of Oil Recovery, Roros, Norway, Jun. 7-10, 1994, pp. 1-16.
Mlacnik et al.; "Sequentially Adapted Flow-Based PEBI Grids for Reservoir Simulation" SPE 90009, SPE Annual Technical Conference and Exhibition, Houston, TX, Sep. 26-29 2006, pp. 317-327.
Mundal, Sissel Slettemark el al.; "Simulation of anisotropic heterogeneous near-well flow using MPFA methods on flexible grids" Comput Geosci (2010) 14; pp. 509-525.
Partial International Search Report for PCT/US2014/015935 (SA5125PCT) dated Feb. 25, 2015; pp. 1-6.
Partial International Search Report for PCT/US2015/020677 (SA5262PCT) dated Nov. 4, 2015; pp. 1-5.
Vestergaard, H. et al.; "The Application of Unstructured-Gridding Techniques for Full-Field Simulation of a Giant Carbonate Reservoir Developed With Long Horizontal Wells" IPTC 11512, SPE Reservoir Evaluation & Engineering, vol. 11, No. 6, Dec. 2008; pp. 958-967.
Verma, S. et al.; "A Control Volume Scheme for Flexible Grids in Reservoir Simulation" SPE 37999, SPE Reservoir Simulation Symposium, Dallas, Texas, Jun. 8-11, 1997, pp. 215-227.

* cited by examiner

FIG. 20

SYSTEMS, METHODS, AND COMPUTER-READABLE MEDIA FOR MODELING COMPLEX WELLBORES IN FIELD-SCALE RESERVOIR SIMULATION

PRIORITY CLAIM

This application is a divisional of and claims priority to U.S. Non-Provisional patent application Ser. No. 14/171,815 filed on Feb. 4, 2014, entitled "Systems Methods, and Computer-Readable Media for Modeling Complex Wellbores in Field-Scale Reservoir Simulation," which claims priority to U.S. Provisional Patent Application No. 61/766,056 filed on Feb. 18, 2013, entitled "Systems Methods, and Computer-Readable Media for Modeling Complex Wellbores in Field-Scale Reservoir Simulation," the disclosures of each are hereby incorporated by reference in their entirety for the purposes of United States patent practice.

BACKGROUND OF THE INVENTION

1. Field of the Invention

This invention relates generally to the computerized simulation of hydrocarbon reservoirs and, more particularly, to computerized simulation multiphase multicomponent flow and transport processes involving complex well geometry such as complex maximum reservoirs contact (MRC) wells. These wells can be densely populated within the reservoirs.

2. Description of the Related Art

Oil, gas, and other natural resources are used for numerous energy and material purposes. A reservoir in a geologic body or other formation may contain oil, natural gas, water, and several constituent compounds. Reservoirs simulation refers to the modeling of such components to predict the multiphase fluid flow and transport processes in the reservoir. Reservoir simulations may be run before, during, or after a well is drilled to determine the viability of the well, the production rate, and so on. With the advancement of drilling technology, wells having multiple branches and highly complex geometries are increasingly being deployed in some reservoirs. In order to enhance production and other processes in these reservoirs, the accuracy of flow modeling and other techniques has presented numerous challenges and increased difficulty. Moreover, the accuracy of flow modeling and other simulation techniques may affect the performance prediction for wells in these reservoirs and the ultimate decision to extract the natural resources.

SUMMARY OF THE INVENTION

Various embodiments of systems, methods, and computer-readable media are provided for a near-well unstructured grid model builder for generating a full-field unstructured grid for reservoir simulation. In some embodiments, a method for generating a near-well unstructured grid is provided. The method includes receiving, by one or more processors, input data and determining, by one or more processors, a field polygon based on the input data. The input data includes a structured geocellular model having a well or a structured reservoir simulation having a well or a structured reservoir simulation having a well and well trajectory data and completion data for the well. The method further includes determining, by one or more processors, a reservoir polygon having a region of interest containing the well and generating, by one or more processors, a plurality of grid points. The plurality of grid points include a plurality of well grid points based on a first grid size and a plurality of other grid points outside of the region of interest based on a second grid size, the second grid size coarser than the first grid size. Additionally, the method includes performing, by one or more processors, a Delaunay triangulation based on the generated grid points and generating, by one or more processors, a Voronoi grid based on the Delaunay triangulation. The method also includes generating, by one or more processors, a near-well unstructured grid based on the Voronoi grid. Generating the near-well unstructured grid includes generating a geometry of the near-well unstructured grid, generating properties of the near-well unstructured grid, and generating perforation of the near-well unstructured grid.

In another embodiment, a non-transitory tangible computer-readable storage medium having executable computer code stored thereon for generating a near-well unstructured grid is provided. The computer code has a set of instructions that causes one or more processors to perform the following: receiving, by one or more processors, input data and determining, by one or more processors, a field polygon based on the input data. The input data includes a structured geocellular model having a well or a structured reservoir simulation having a well or a structured reservoir simulation having a well and well trajectory data and completion data for the well. The computer code further includes a set of instructions that causes one or more processors to perform the following: determining, by one or more processors, a reservoir polygon having a region of interest containing the well and generating, by one or more processors, a plurality of grid points. The plurality of grid points include a plurality of well grid points based on a first grid size and a plurality of other grid points outside of the region of interest based on a second grid size, the second grid size coarser than the first grid size. Additionally, the computer code further includes a set of instructions that causes one or more processors to perform the following: includes performing, by one or more processors, a Delaunay triangulation based on the generated grid points and generating, by one or more processors, a Voronoi grid based on the Delaunay triangulation. The computer code further includes a set of instructions that causes one or more processors to perform the following: also includes generating, by one or more processors, a near-well unstructured grid based on the Voronoi grid. Generating the near-well unstructured grid includes generating a geometry of the near-well unstructured grid, generating properties of the near-well unstructured grid, and generating perforation of the near-well unstructured grid.

In another embodiment, a system for generating a near-well unstructured grid is provided. The system includes one or more processors and a non-transitory tangible computer-readable memory having executable computer code stored thereon. The computer code comprising a set of instructions that causes one or more processors to perform the following: receiving, by the one or more processors, input data. The input data includes a structured geocellular model having a well or a structured reservoir simulation having a well or a structured reservoir simulation having a well and well trajectory data and completion data for the well. The computer code further includes a set of instructions that causes one or more processors to perform the following: determining, by the one or more processors, a reservoir polygon having a region of interest containing the well and generating, by the one or more processors, a plurality of grid points having a first grid size in the region of interest. The computer code further includes a set of instructions that causes one or more processors to perform the following: performing, by the one or more processors, a Delaunay triangulation based on the generated grid points and generating, by the one or more processors, a Voronoi grid based on the Delaunay triangulation. The computer code also includes a set of instructions that causes one or more processors to perform the following: generating, by one or more processors, a near-well unstructured grid based on the Voronoi grid and providing, over a network coupled to the one or more processors, the near-well unstructured grid to a parallel reservoir simulator. Generating the near-well unstructured grid includes generating a geometry of the near-well unstructured grid, generating properties of the near-well unstructured grid, and generating perforation of the near-well unstructured grid.

In another embodiment, a non-transitory tangible computer-readable storage medium having executable computer code stored thereon for a workflow interface for generating a near-well unstructured grid is provided. The computer code comprising a set of instructions that causes one or more processors to perform the following: define a workflow interface for a near-well unstructured grid builder. The workflow interface is configured to define input data for the near-well unstructured grid builder and define gridding options for the near-well unstructured grid builder. Additionally, the workflow interface is configured to display well data of the input data in a 2D or 3D visualization and provide well data and a region of interest within the input data to an unstructured grid model builder for generation of an unstructured grid. Additionally, the workflow interface is configured to display geometry of the generated unstructured grid, display the properties of the generated unstructured grid, and display the perforation of the generated unstructured grid.

In yet another embodiment, a computer-implemented method for constructing an unstructured grid is provided. The method includes receiving, by one or more processors, a structured grid having a first plurality of grid points and a well of a reservoir, and determining, by one or more processors, a region of interest in the structured grid. The method further includes generating, by one or more processors, a second plurality of grid points in the region of interest according to a first grid size and constructing, by one or more processors, a 2.5 D unstructured grid from the second plurality of grid points and the third plurality of grid points. Additionally, the method includes processing, by one or more processors, the 2.5 unstructured grid via a reservoir simulator to produce a simulation of the reservoir.

BRIEF DESCRIPTION OF THE DRAWINGS

FIGS. 17-34 depict various steps of a process for generating a near-well unstructured grid model using the system of FIGS. 1-3 in accordance with an embodiment of the present invention.

Figure 1:
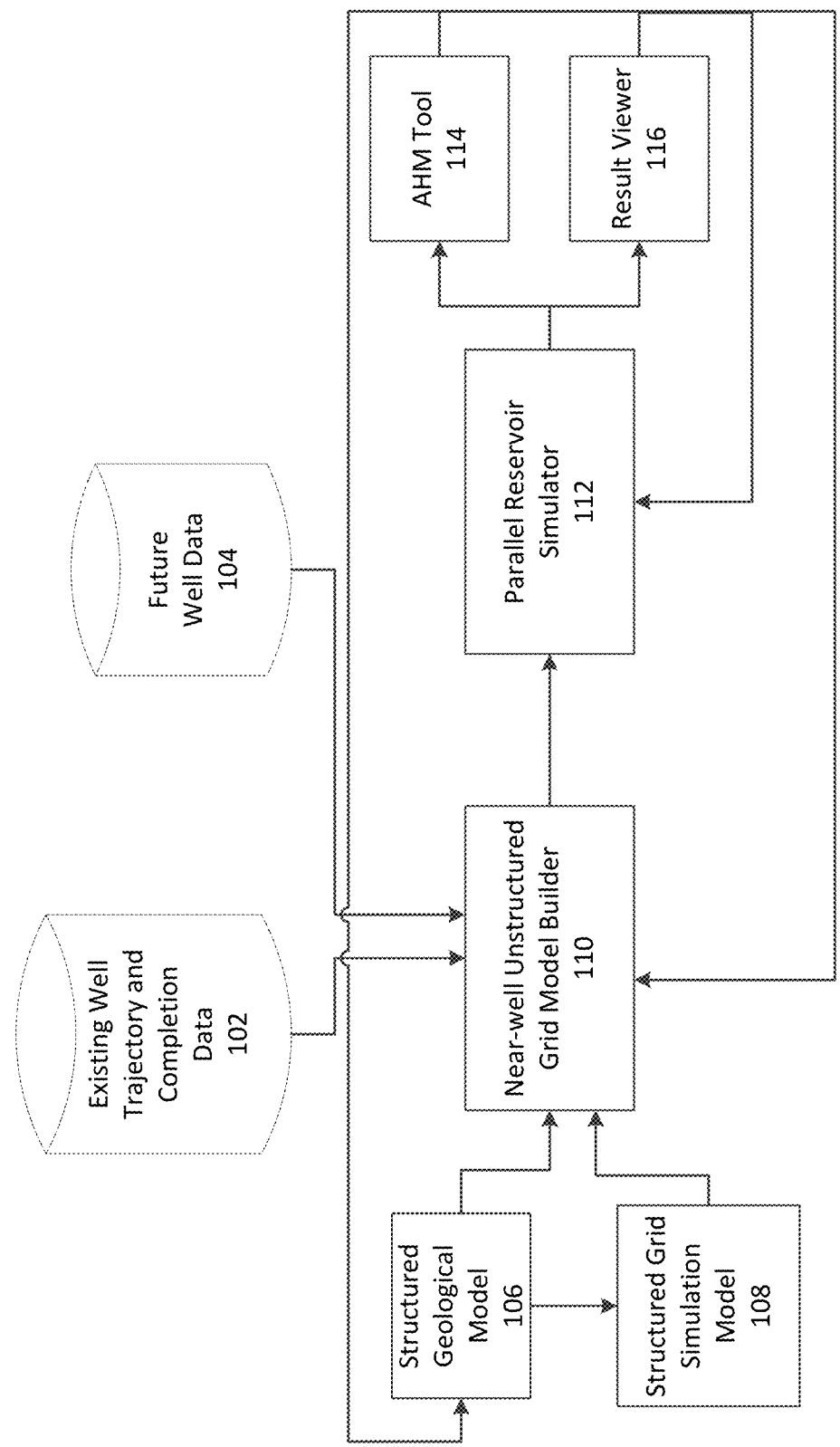
FIG. 1 is a block diagram of a system for generating a near-well unstructured grid and performing a full field unstructured grid reservoir simulation in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As described further below, systems, methods, and computer-readable media are provided for a near-well unstructured grid model builder for generating a near-well unstructured grid for full-field reservoir simulation in accordance with an embodiment of the present invention. As described further below, the near-well unstructured grid model builder may include a workflow interface and a parallel unstructured grid model builder. The inputs to the near-well unstructured grid model builder may include existing well trajectory and completion data, future well data, a geological model, a structured grid simulation model, or any combination thereof.

The workflow interface of the near-well unstructured grid model builder may set user preferences and gridding options such as inputs and grid sizes. The workflow interface may include 2D and 3D rendering tools that visualize the well data and enable a user to view a field polygon. A user may use the workflow interface to create a reservoir polygon having regions of interest in the field polygon. The workflow interface may then provide a job interface for submission of jobs to the parallel unstructured grid model builder and monitoring of the jobs.

The parallel unstructured grid model builder constructs an unstructured grid based on the data and gridding options defined via the workflow interface. The parallel unstructured grid model builder analyzes the well trajectory and perforation data for compatibility and samples well trajectory points contained by the perforation start and end points based on the grid size to produce well grid points. The parallel unstructured grid model builder then generates and optimizes grid points, and the generation may include multi-level local grid refinement. Additionally, well grid points are computed and grid points are assigned weights, such that the well grid points may have higher weights than the close quad-tree local grid refinement points. Additionally, in some embodiments parallel grid points are placed on both sides of the well grid points. The parallel unstructured grid model builder further includes an unconstrained Delauney triangulation using the generated grid points. After the Delaunay triangulation, the parallel unstructured grid model builder generates a Voronoi grid (Voronoi cells) using perpendicular bisection of the triangle edges of the Delaunay triangulation. Next, the parallel unstructured grid module builder generates the unstructured grid geometry, the unstructured grid properties, and the unstructured grid perforation.

The workflow interface also enables a user to view and evaluate the generated unstructured grid geometry, the unstructured grid properties, and the unstructured grid perforation. The generated unstructured grid geometry may be displayed in a rendering tool of the workflow interface. The generated unstructured grid properties may be displayed in a property analysis tool of the workflow interface, and the generated unstructured grid perforation may be displayed in a perforation analysis tool of the workflow interface. Additionally, the workflow interface may include a region data constructer for constructing unstructured region data from structured region data selected by a user.

The unstructured grid generated by the near-well unstructured grid builder may be provided to a parallel reservoir simulator for reservoir simulation. The output from the parallel reservoir simulator may be provided to a results viewer and data analyzer for post-simulation analysis and visualization. An inputted geological model may be updated, or additional local regridding may be performed based on the analysis. Additionally, the reservoir simulation results may be provided to an assisted history match tool to perform a model update or to perform sensitivity analysis.

FIG. 1 depicts a system 100 generating a near-well unstructured grid and performing a full field unstructured grid reservoir simulation in accordance with an embodiment of the present invention. As used herein, the term "near-well unstructured grid" refers to an unstructured grid generated according to the techniques described herein. As shown in FIG. 1, the well trajectory and completion data 102 for wells in a reservoir may be obtained. The well trajectory and completion data may be obtained (e.g., exported) from a well database having well trajectory survey data and completion data with time and completion intervals. The well trajectory data may include sets of x-y-z spatial points describing the wellbore spatial locations of each branch of each well (e.g., conventional or complex MRC wells). The completion data may include the start and end points of each completion interval along the wellbores and the time intervals when that completion is open to flow.

Additionally, future well data 104 (e.g., well trajectory data for future wells) may be obtained. The future well data may include data for planned future wells in a reservoir and may be in various formats, such as an ASCII data file, an existing structured grid reservoir simulation model recurrent data file, or other suitable formats. The system 100 also includes a structured geological model 106 (also referred to as a "geocellular model") obtained from a geological modeling process. In some embodiments, the structured geological model 106 is constructed from a geocellular model for a field for the purpose of reservoir simulation. The structured geological model 106 may describe the geometry and property data for one or multiple reservoirs. Further, a structured grid simulation model 108 is also obtained. In some embodiments, the structured grid simulation model 108 is generated by upscaling the structured geological model 106. In such embodiments, the model geometry of the structured grid simulation model 108 may be defined by corner point geometry (CPG) format or variable-depth variable-thickness Cartesian (IJK) grid format. In some embodiments, the structured grid simulation model 108 may be a previously history matched dataset or may be partially matched dataset.

Figure 2:
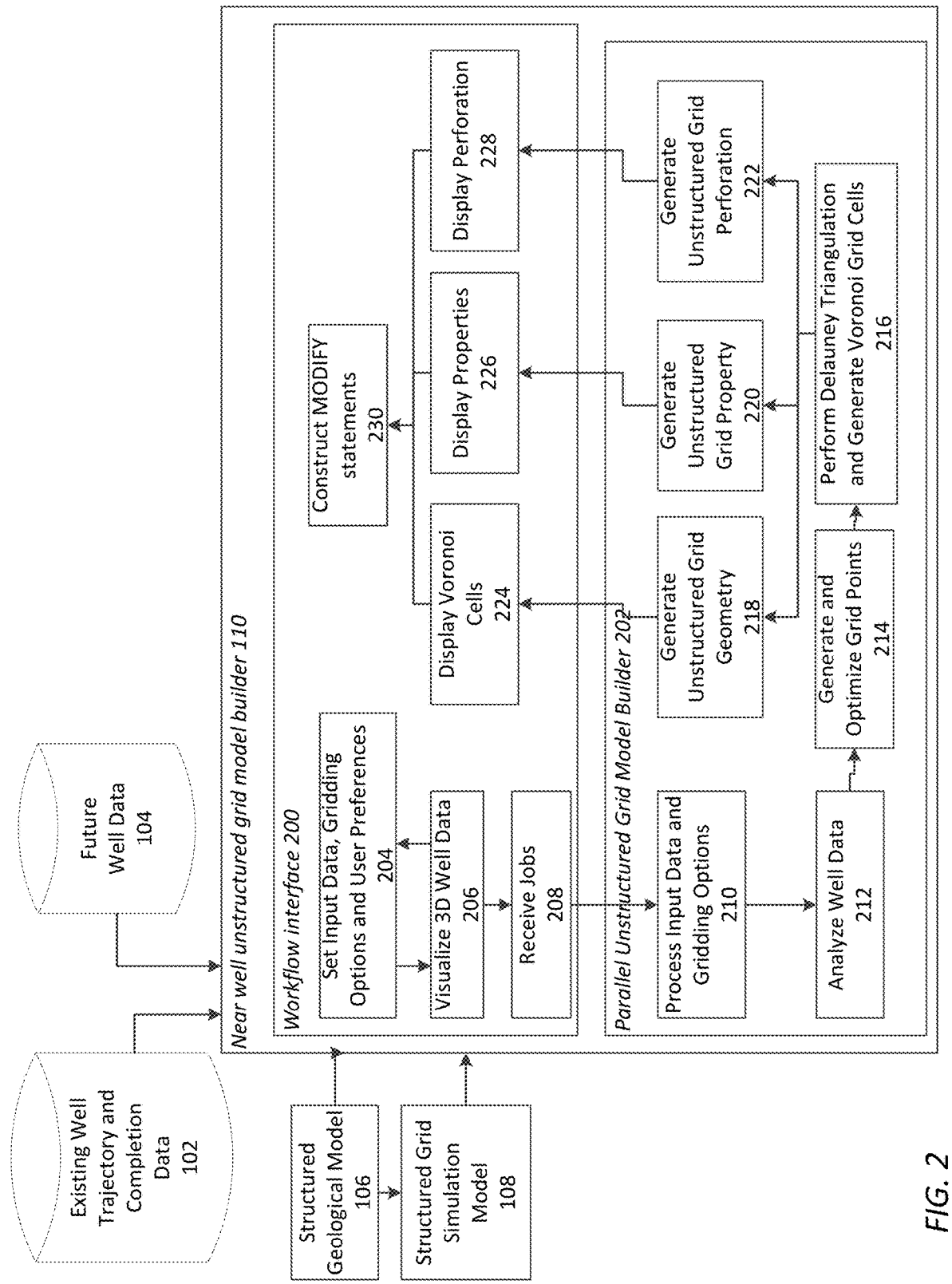
FIG. 2 is a block diagram of the near-well unstructured grid model builder of FIG. 1 in accordance with an embodiment of the present invention.
Figure 3:
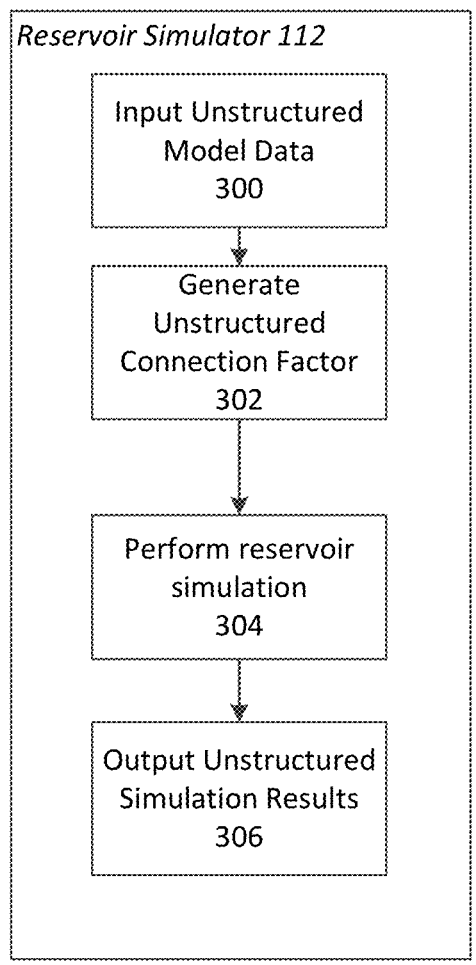
FIG. 3 is a block diagram of the parallel reservoir simulator of FIG. 1 in accordance with an embodiment of the present invention.

As described further below, the data 102, and the model 106, the model 108, or both, are provided as inputs to a near-well unstructured grid model builder 110. Additionally, in some embodiments the future well data 104 is provided as input to the near-well unstructured grid model builder 110 for performance prediction. The near-well unstructured model builder 110 is illustrated in FIG. 2 and described in further detail below. The system 100 may also include a parallel reservoir simulator 112 for performing a reservoir simulation based on the unstructured grid model generated by the near-well unstructured grid model builder 110. An embodiment of the parallel reservoir simulator 112 is illustrated in FIG. 3 and described further below. In some embodiments, the parallel reservoir simulator 112 may be the GigaPOWERS™ simulator manufactured by Saudi Aramco of Dhahran, Saudi Arabia. The parallel reservoir simulator 112 may perform a reservoir simulation using the near-well unstructured grid generated by the near-well unstructured grid model builder 110.

In some embodiments, the system 100 may also include an assisted history match (AHM) tool 114. The AHM tool 114 may perform simulation model updates for reservoir history match processing or may perform sensitivity analyses over a range of parameters to determinate the response surface of the reservoir simulation. In some embodiments, the AHM tool 114 may generate multiple simulation data sets which can be submitted to the parallel reservoir simulator 112. For example, each simulation for each such simulation data sets may each be a parallel job running on an assigned group of computation nodes in high performance computing (HPC) system. In some embodiments, the AHM tool 114 may receive MODIFY statements (described further below) generated by the near-well unstructured grid model builder 110.

Additionally, in some embodiments the system 100 may include an unstructured grid reservoir simulation result viewer and data analyzer 116. The result viewer and data analyzer 116 may include an import engine to input the results (e.g., result files) from the parallel reservoir simulation 112 for post simulation analysis and visualization. In some embodiments, the structured geological model 106 may be updated based on the analysis and visualization provided by the results viewer. Additionally, in some embodiments, the near-well unstructured grid model builder 110 may perform regridding or generate additional MODIFY statements for further history matching based on the output from the results viewer and data analyzer 116. Further, in some embodiments, additional simulations may be performed by the parallel reservoir simulator 112 based on the output from the results viewer and data analyzer 116.

FIG. 2 depicts the near-well unstructured grid model builder 110 in further detail in accordance with an embodiment of the present invention. The near-well unstructured grid model builder 110 may include a workflow interface 200 and a parallel unstructured grid model builder 202. As described further below, the parallel unstructured grid model builder 202 may be implemented on one or more computers in various arrangements for parallel processing. In some embodiments, the workflow interface 200 may be implemented as a graphical user interface (GUI) having windows, menus, icons, toolbars, and other components to provide various graphical functionalities. Such graphical functionalities may include, for example, drawing, 2D and 3D rendering, object selection, camera manipulation control (e.g., via a mouse), interactive dialog boxes, and other graphical functionalities. In some embodiments, interactive dialog boxes enable communication between the near-well unstructured grid model builder 110 and a user. In such embodiments, the interactive dialog boxes may enable a user to execute user specific commands, display computation results, and prompt a user (e.g., via a sub-window) to respond to requests for data or instructions. The workflow interface 200 enables definition and visualization of the input data to the near-well unstructured grid model builder 110 before the input data is provided to the parallel unstructured grid model builder 202 for further processing. Advantageously, the workflow interface 200 provides functionalities and tools to the user in an intuitive manner so that the unstructured grid model building tasks may be launched and completed from the workflow interface 200 without additional complexity of other interfaces or switching outside of the user's computing environment.

As described above, the near-well unstructured grid model builder 110 may receive various gridding inputs, such as the existing well trajectory and completion data 102, the future well data 104, the structured geological model 106, the structured grid simulation model 108, or different combinations thereof. The workflow interface 200 may enable a user to set gridding inputs and user preferences (block 204). For example, a user may specify the gridding input data sources for obtaining the inputs described above, various user preferences, and various gridding options. In some embodiments, for example, this functionality may be provided by a tab widget that provides visualization of the user settings and data viewing functions via buttons or other user interface elements. In some embodiments, the gridding options may include the polygon and grid size for each of the regions-of-interest of the wells input to the near-well unstructured grid model builder 110. In some embodiments, the initial grid size for the regions of interest may be set based on the geological model 106 or the structured grid simulation model 108 and, in such embodiments, the initial grid points may be the cell center points of the geological model 106 or the structured grid simulation model 108 projected on a 2D gridding plane within the regions of interest. Otherwise, the grid point distribution described below may be generated based on the user-specified grid size.

In some embodiments, the default polygon may be the field polygon based on the structured grid and coordinate system obtained from the geological model 106 or the structured grid simulation model 108. For example, the field polygon may be a 2D representation of the geological model 106 that defines the simulation domain where the reservoirs and wells are contained and the corresponding region to be gridded and studied. The near-well unstructured grid model builder 110 may be defined with the field rectangle polygon at the coarsest grid level followed by one or more multiple reservoir polygons for each reservoir in the field. Additionally, local grid refinement regions may be added within the reservoir regions to further refine grids in regions of interest. As described further below, the near-well unstructured grid model builder 110 includes techniques for boundary conforming grids of the near-well regions at the well bore using multi-level quad tree processes, which provide smooth grid transition from well grids to reservoir grids, or the inter-wellbore grid.

Figure 17:
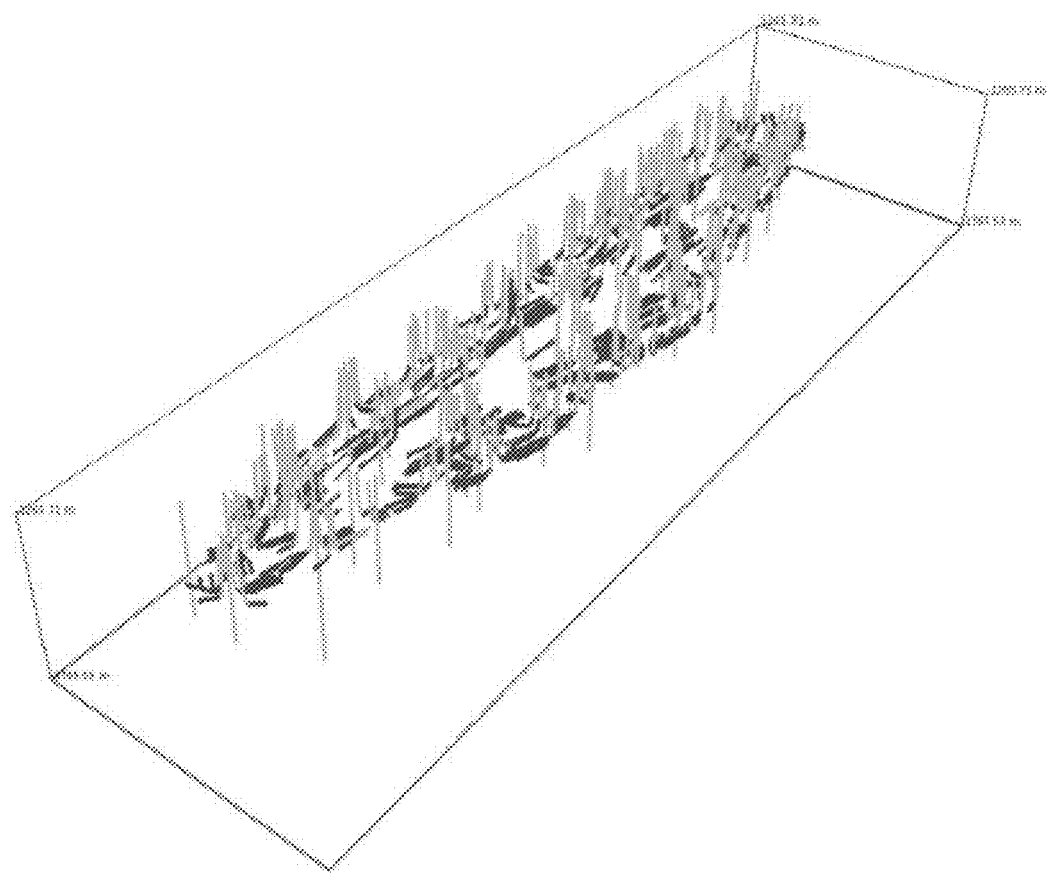

After the field polygon has been defined, the well data may be visualized by a 3D renderer (block 206). For example, the well trajectory and completion data may be visualized in a 3D Universal Transverse Mercator (UTM) coordinate system. In some embodiments, the well path and perforations may be extracted from the existing well trajectory and completion data 102 and, in some embodiments, the future well data 104. In some embodiments, the visualization of 3D well data may include drawing the well path and peroration using user-selected colors specified in step 204 (e.g., in a tab widget). Additionally, in some embodiments the displayed completion open and close of the well may be based on completion dates in the existing well trajectory and completion data 102 and a simulation interval specified by the user in step 204. FIG. 17 illustrates an example of the visualization of well data in 3D in accordance with an embodiment of the present invention.

The well data may be visualized on top of the field polygon and may be viewed in 2D and 3D. In the 3D view, the top depth and bottom depth of the geological model 106 may be displayed such that well locations may be easily viewed. The 3D viewer of the workflow interface 200 may include camera manipulation and zooming to enable easy viewing controls via a mouse, keyboard, or other suitable input devices. The camera of the 3D viewer may responds instantly to changes in the viewing options and zooms to show all of the wells of interest in the view while providing sufficient geometry details. Additionally, when viewing individual well options, the user may sequentially scroll each well via the keyboard (or other input device) and may jump to select a different well via the mouse (or other input device) such that only a selected well is displayed. In response to these user actions, the camera orientation and focal point will be automatically adjusted to move to the well with a correctly computed zoom so that sufficient geometry details are viewable for close examination by the user. Advantageously, the 3D viewer enables fast and effective viewing of all wells, groups of well, or individual wells, Consequently, the visualization of 3D data (e.g., wells, top and bottom horizons of a model, and the field polygon) enables examination of the well locations in the field domain so that the consistency of the well data extracted from the existing well trajectory and completion data 102 and the future well data 104 may be verified against the coordinate system obtained from the geological model 106 and the structured grid simulation model 108.

Figure 18:
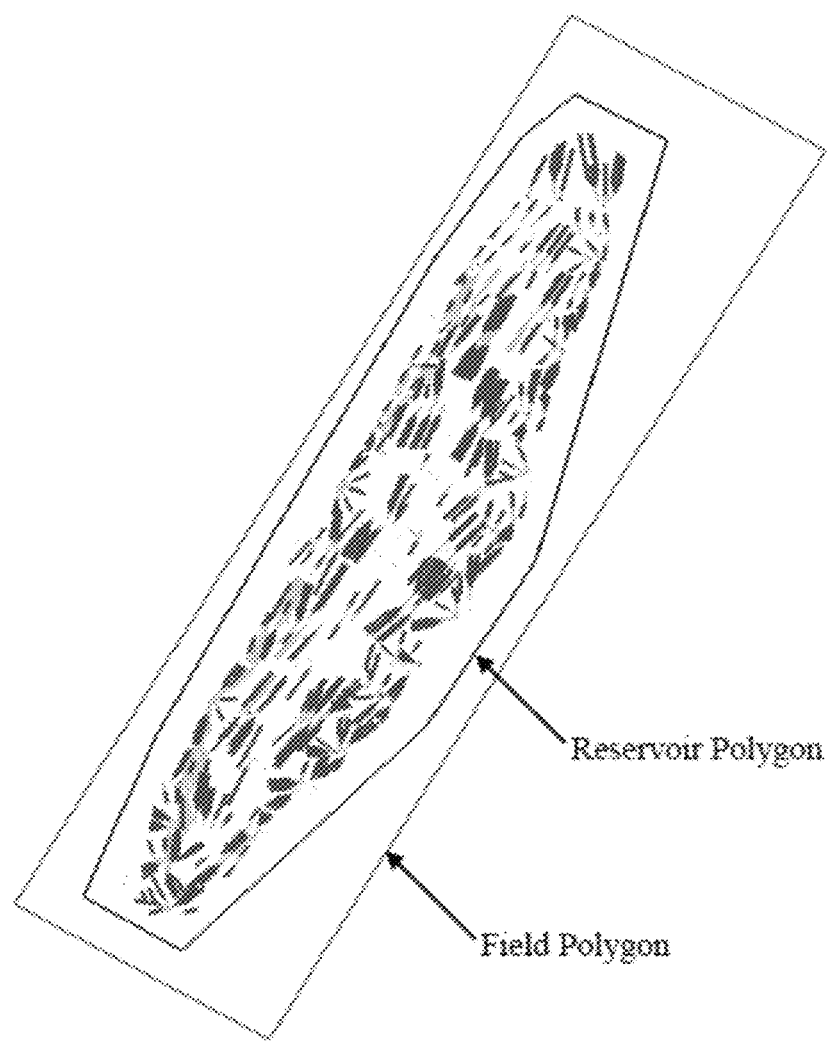

After the well data is visualized, additional gridding inputs, options, and user preferences may be set (block 204) by a user based evaluation of the visualized well data. The reservoir polygon may be initially designed as a 2D polygon with any shape (e.g., irregular) inside of the field polygon while covering all of the wells. A user may use an interactive drawing tool provided in the workflow interface 200 to connect points (e.g., defined via mouse clicks) on the field polygon and automatically close the polygon with the first and last points. The reservoir polygon may define the regions-of-interest for the near-well unstructured grid model builder 110, and the field polygon may define the domain volume in which the reservoir simulation is conducted. For example, the reservoir polygon may define the region occupied by each reservoir in the domain volume. Accordingly, the field polygon and the reservoir polygon divide the simulation domain so that the simulation can be concentrated on the near-well regions within the reservoir polygon. FIG. 18 illustrates an example of a field polygon and a reservoir polygon defining regions of interest for the near-wellbore unstructured grid model builder 110 in accordance with an embodiment of the present invention. Additionally, as described above, a coarse grid size may be specified for the field polygon while finer grid sizes are applied on the reservoir polygons and the wellbores. Advantageously, this multi-level gridding strategy provides for the spacing of grid points in a particular region to be determined by the grid size of that region, but grid points are prioritized based on importance. As described further below, point priority may control the removal and adjustment of points of the parallel unstructured grid model builder 202.

After regions of interested are identified and other gridding options are set and well data is verified, parallel model building jobs are submitted by a user and received (block 208) via a job interface. The job interface may also enable a user to submit and monitor the parallel model building jobs. As described further below, the parallel model building jobs may be submitted to the parallel unstructured grid model builder 202. In some embodiments, for example, the parallel unstructured grid model builder 202 may be executed on a high performance computing (HPC) cluster.

Within the parallel unstructured grid model builder 202, the unstructured gridding data input to the builder 202 may be processed (block 210). For example, the unstructured gridding data may be verified and provided for further processing by the parallel unstructured grid model builder 202. Additionally, in some embodiments, I/O error handlings are processed. For example, the processing may include verifying whether a defined reservoir polygon is contained in the field polygon and if there is any perforated wells outside of the reservoir polygon. Further, in some embodiments the processing may include verifying if required options are complete, such as a grid size for each region of interest, and so on. The processing may ensure that the gridding options and data are complete and valid so that the model building may progress without errors.

After the gridding options and input data is processed, the well trajectory and perforation data obtained from the existing well trajectory and completion data 102 and future well data 104 is analyzed (block 212). The analysis may include verifying the compatibility between the well trajectory data and the perforation data to ensure the well perforation adheres to the well trajectory. Any errors detected by the analysis may be reported, such as in the workflow interface 200. After the verification is complete, the well trajectory points contained by the perforation start and end points may be sampled based on the grid size in the regions of interest. The sampled trajectory points are well grid points used in subsequent processing. Advantageously, the sampling accounts for the complicated well paths that may involve multiple curves, by using measured depth values to track the perforations along the well path. Moreover, the sampling may keep all the points necessary to adhere to the well trajectory but also skip unnecessary points when the well paths are straight.

Next, the grid points of the unstructured grid are generated (block 214). As described below, full-field unstructured gridding may be performed. The gridding steps may include the following: generating field grid points having a field grid size a first weighting; generating reservoir grid points having a reservoir grid size and a second weighting; generating well grid points having a well grid size and a third weighting; performing a multi-level quad tree local grid refinement in the near-well regions inside the reservoir polygon; removing grid points using the assigned weightings; performing an unconstrained Delaunay triangulation; generating a Voroni grid via perpendicular bisection of the external boundary of the field domain; detecting and removing degenerate edges of the Voroni grid; and building a 3D volume using the 2.5 D unstructured grid geometry.

Figure 4:
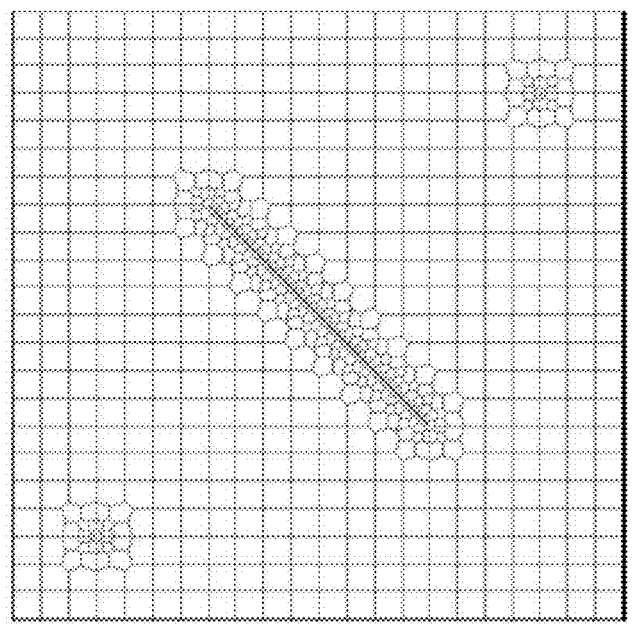
FIG. 4 depicts an example of a well grid with quad tree local grid refinement for two vertical wells and one horizontal well in accordance with an embodiment of the present invention.
Figure 19:
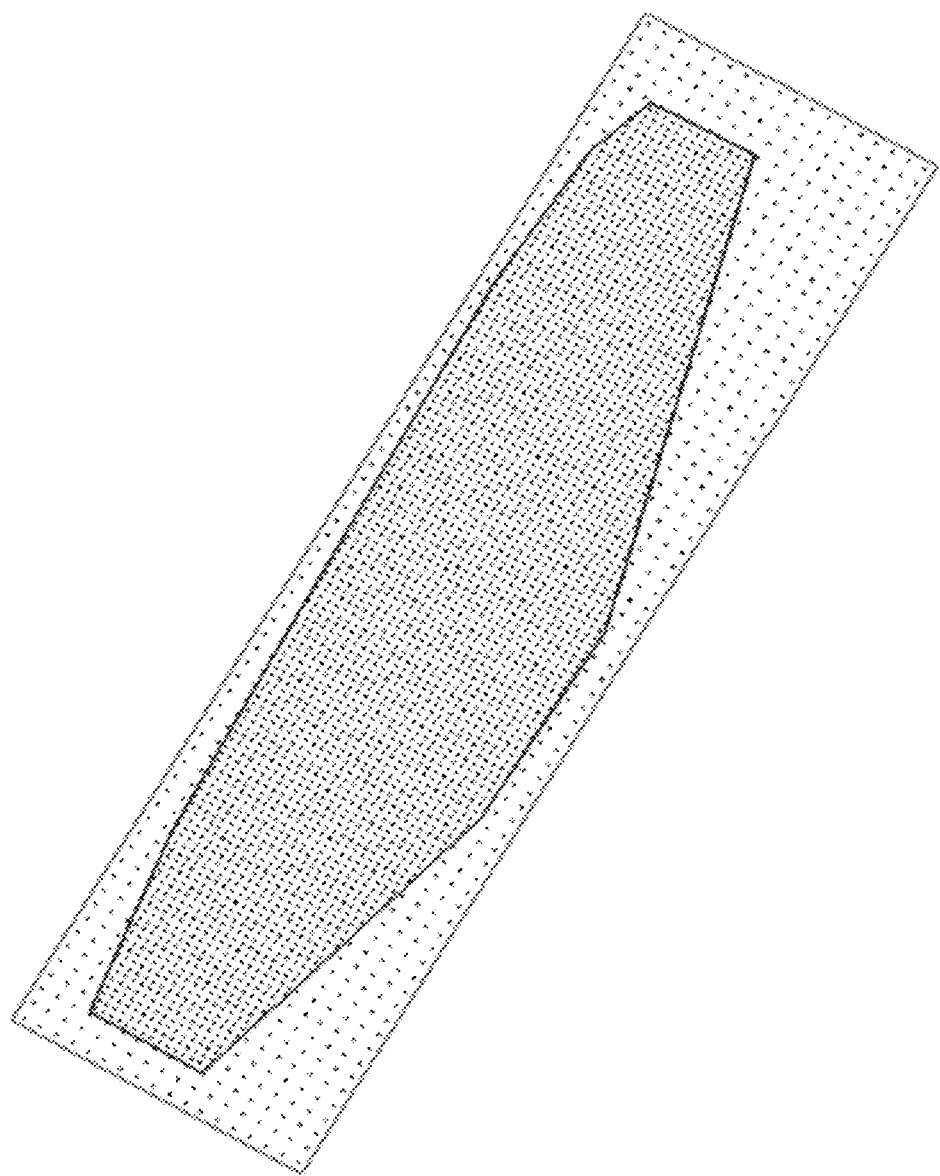
Figure 20:
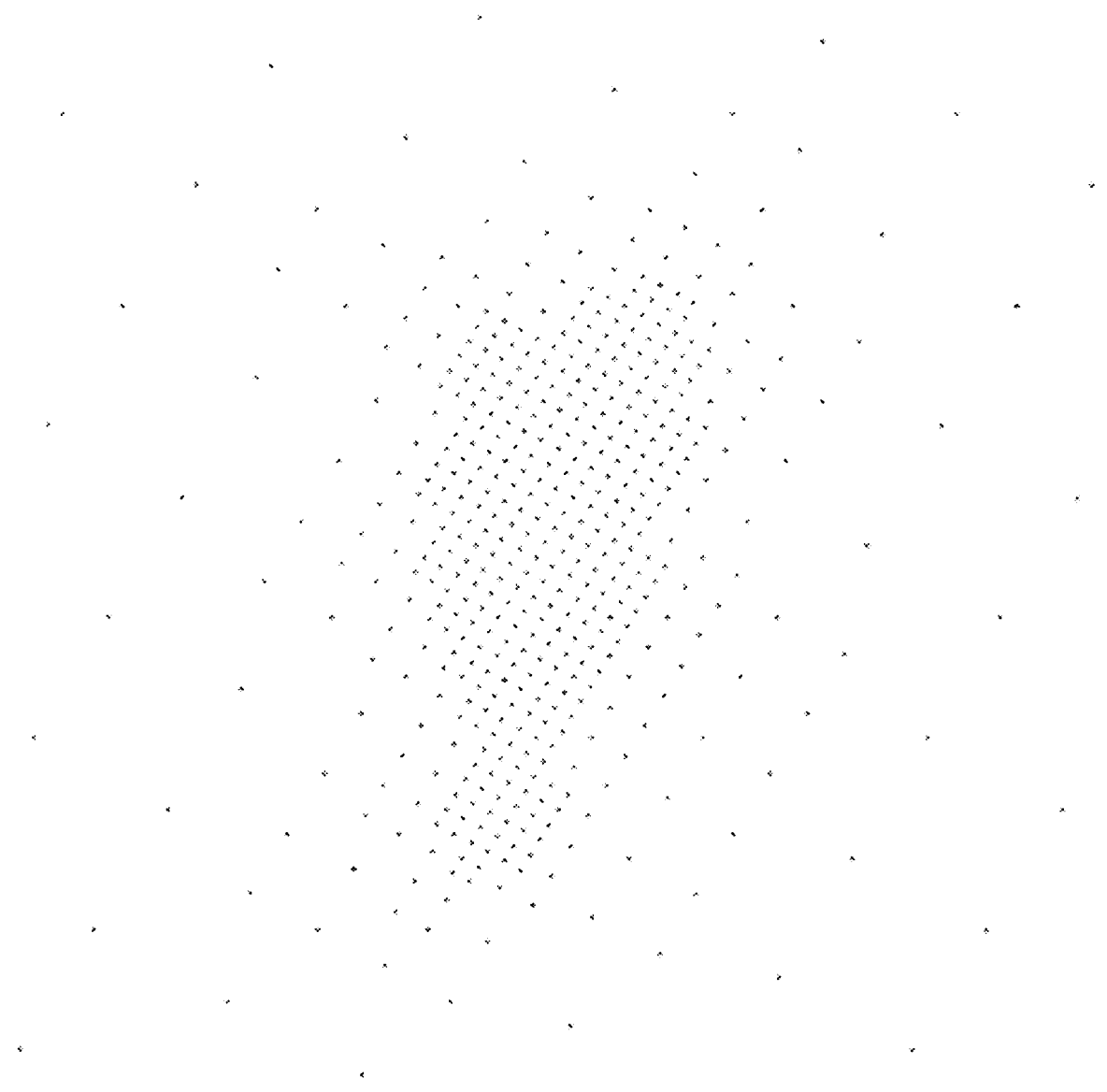

As described above, grid point within the regions of interest may be generated based on the cell center point of the structured geological model 106 or the structured grid simulation model 108 or based on a user specific grid size for the regions of interest. For grid points outside the region of interest, the grid points may be generated based on a user-specified background grid size. FIG. 19 depicts an example of the generation of grid points of the unstructured grid in accordance with an embodiment of the present invention. The generation may include assigning weights (also referred to as "priority") to the grid points and using the weights to adjust or remove conflicting grid points for a good grid quality measure for the entire domain. In some embodiments, generating the grid points may include the following: (1) gridding the reservoir polygon and the region of the field polygon outside of the reservoir polygon based on the region grid size (e.g., spacing) specified by the user (as described in block 204 and for example, may be the Cartesian simulation grid spacing), and (2) applying a multi-level quad tree local grid refinement (LGR) in the near-well regions inside the reservoir polygon to create smooth grid transitions from high resolution well grids to reservoir grids. FIG. 20 illustrates an example of such a multi-level quad tree LGR technique in accordance with an embodiment of the present invention. In some embodiments, the number of levels and distance measure of the multi-level quad tree local grid refinement (LGR) may be specified by the user. An example of a well grid with quad tree LGR for two vertical wells and one horizontal well is depicted in FIG. 4. As described above, the sampled well trajectory points may provide well grid points. The well grid points are evenly distributed points based on a user-specified well point spacing parameter. Well grid points for the well tree may be computed for the completion part of the well, i.e., the portion of the well tree open to flow in the reservoir. Portions of the well borehole not completed may be removed from the well grid point generation.

Figure 5:
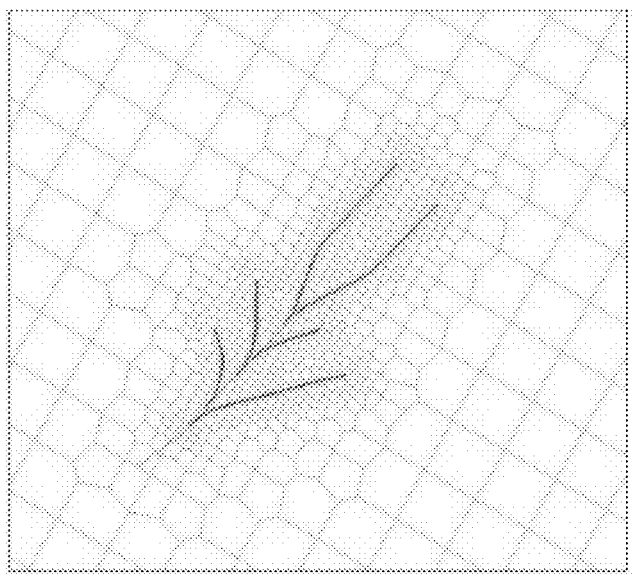
FIG. 5 depicts an example of a complex well with two levels of quad-tree LGR and well grid points in accordance with an embodiment of the present invention.
Figure 6:
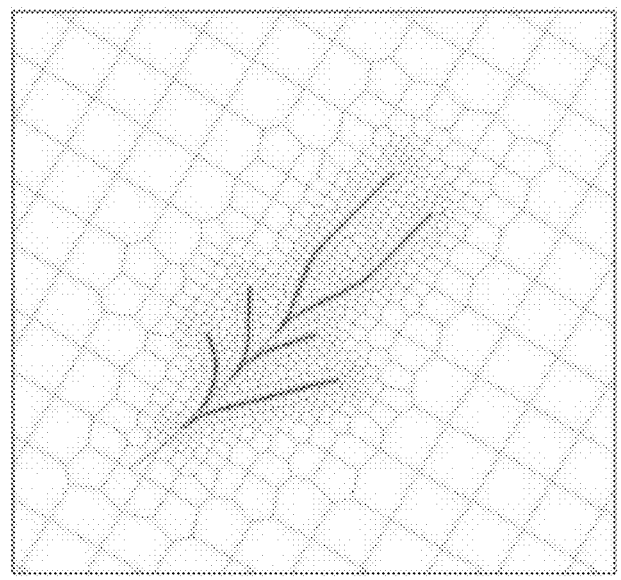
FIG. 6 depicts a complex well with two levels of quad tree LGR and with one parallel track of grid points on both sides of the well points.
Figure 21:
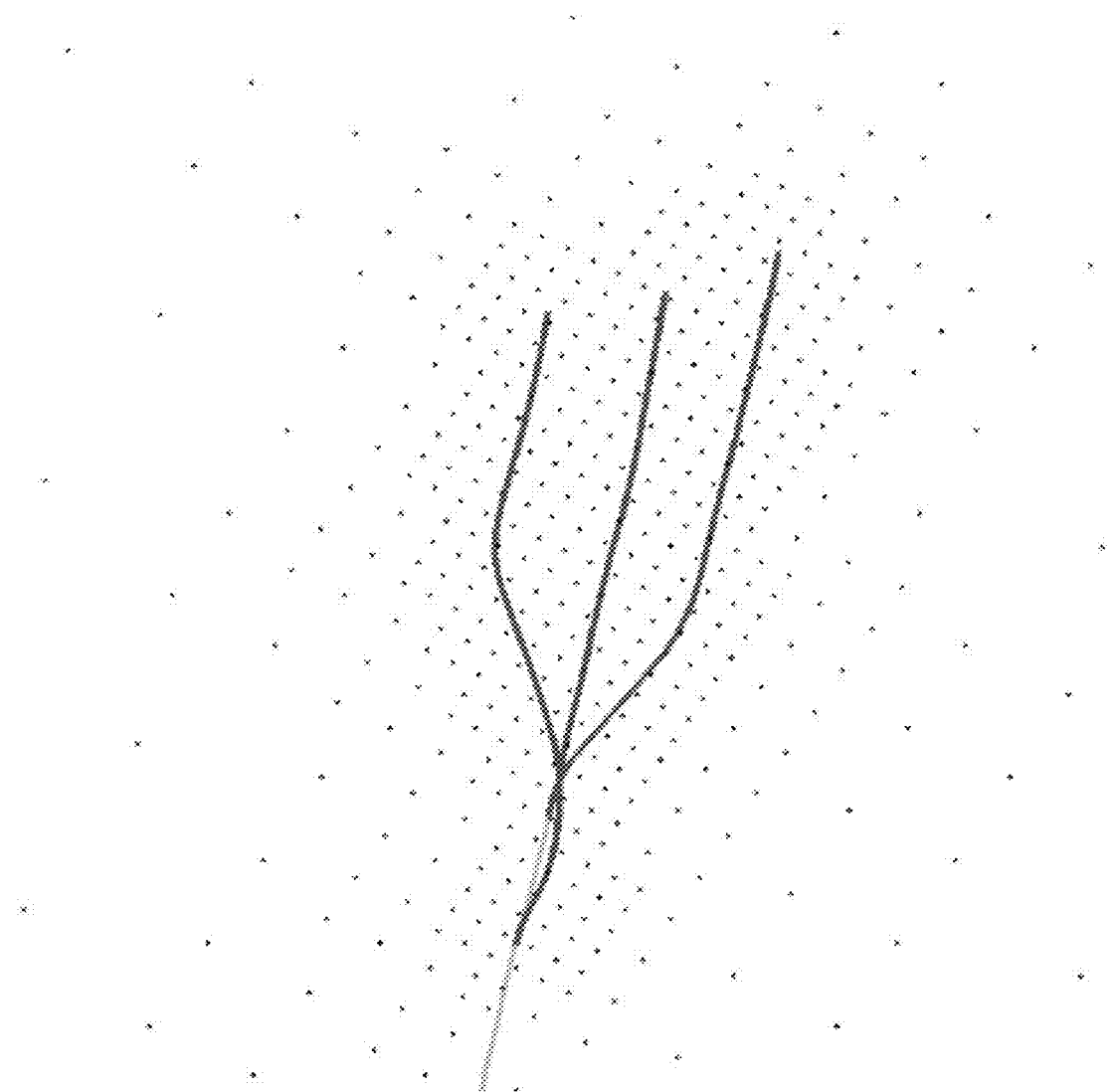
Figure 22:
Figure 23:
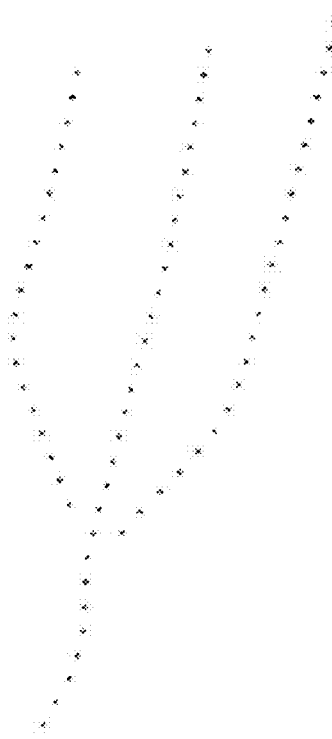
Figure 24:
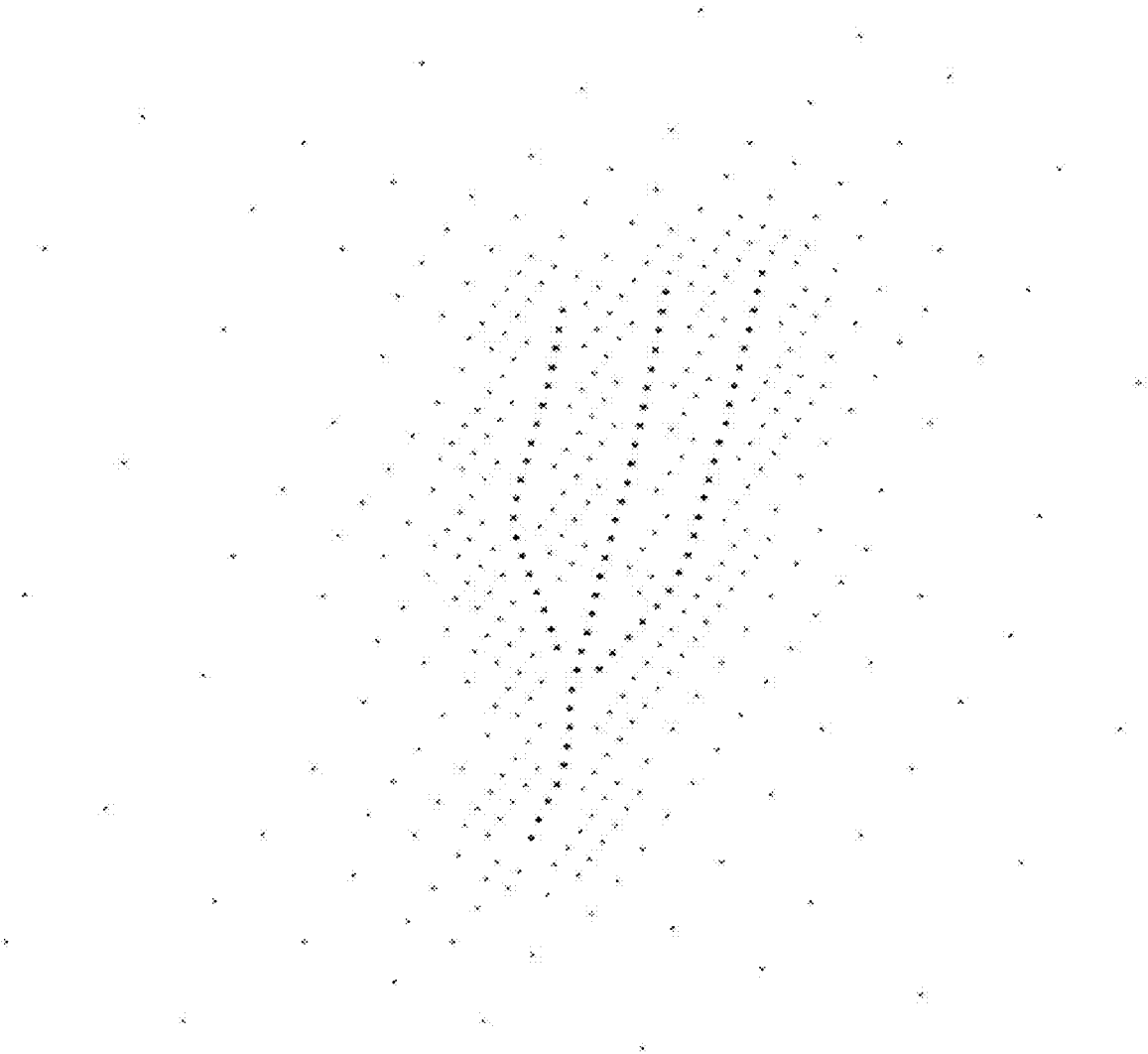
Figure 25:
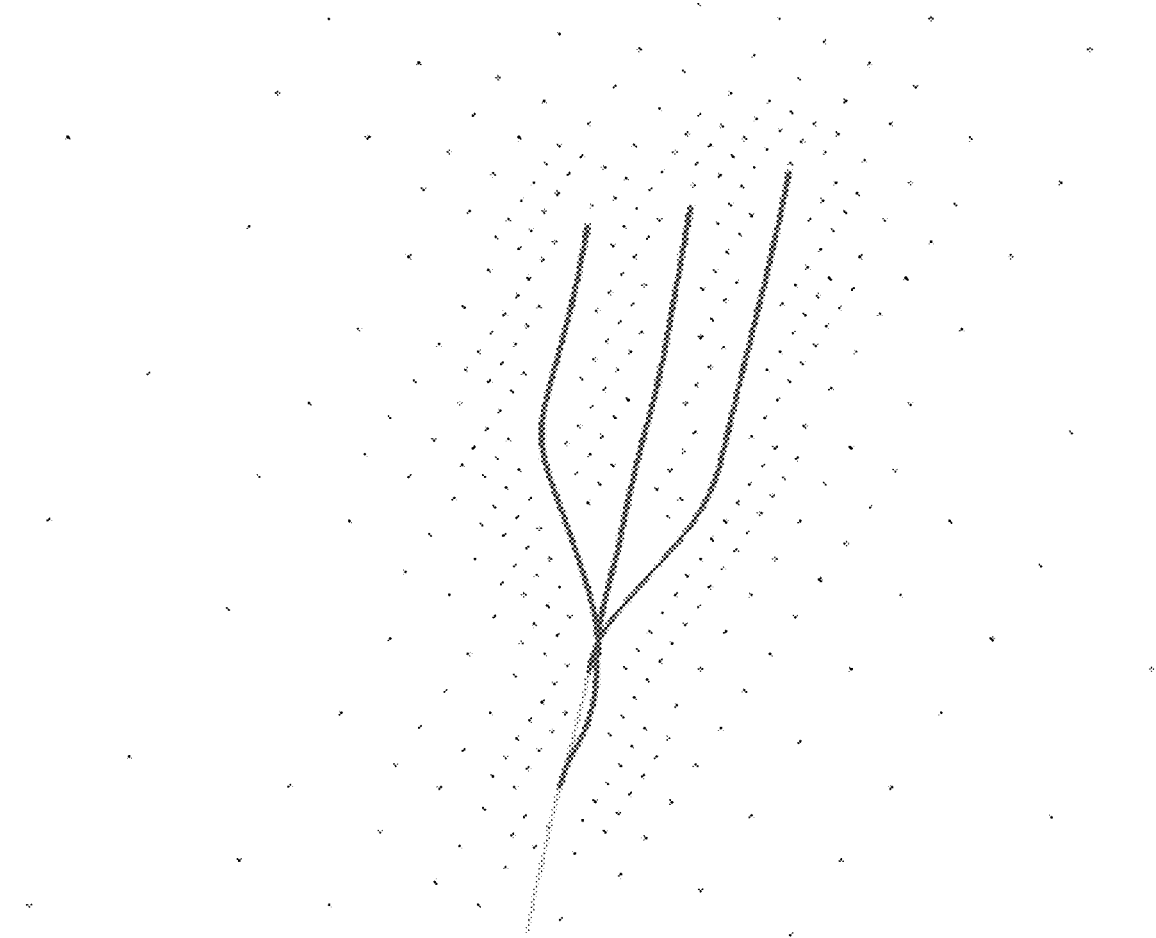
Figure 26:
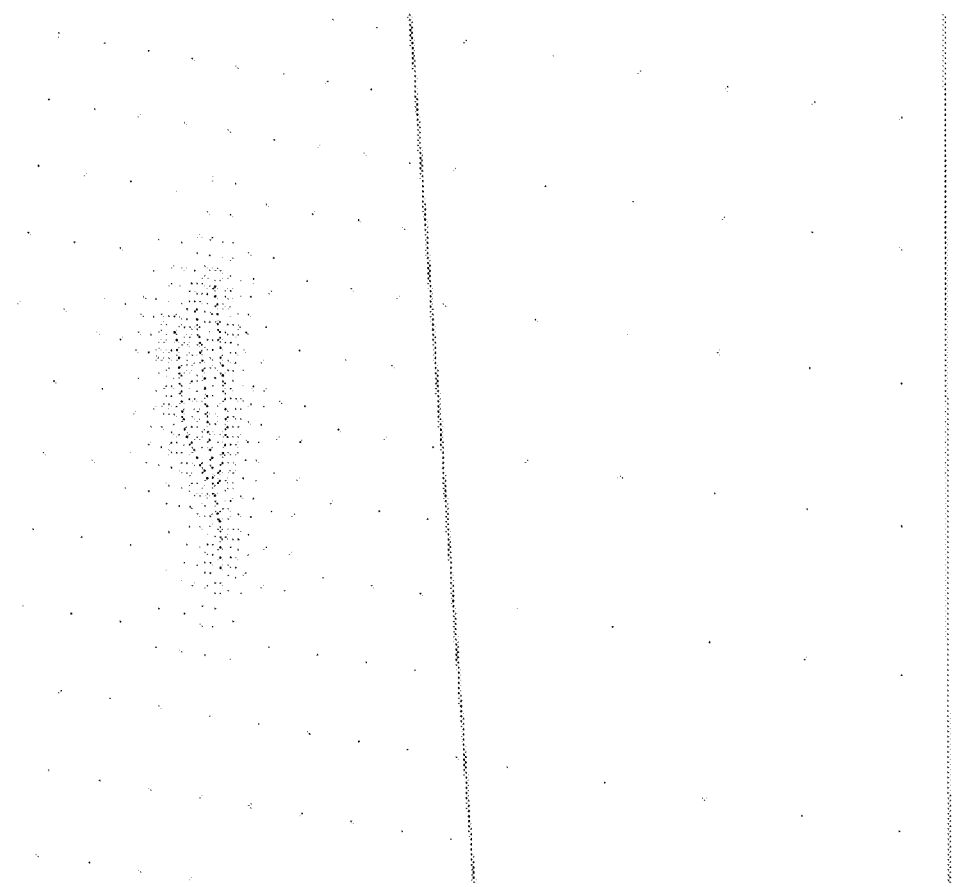

An example of a complex well with two levels of quad-tree LGR and well grid points is depicted in FIG. 5. As will be appreciated, the grid refinement may improve grid quality and appropriately stage the grid resolution for the near-wellbore flow and transport calculations. FIG. 21 illustrates an example near-wellbore refined grid points shown with the projected well-bore trajectory in accordance with an embodiment of the present invention, and, As can be seen in these figures, the refined grid points near the wells do not adhere to the well trajectory as they are the grid points directly generated for the reservoir polygon FIG. 22 depicts an example of a well tree in accordance with an embodiment of the present invention, and FIG. 23 depicts the well grid points for the well tree of FIG. 22. FIG. 24 depicts an example of a near-wellbore region grid point distribution and point removal and adjustment in accordance with an embodiment of the present invention, and FIG. 25 illustrates the wellbore trajectory in relation to the near-wellbore grid depicted in FIG. 24. In some embodiments, parallel near-wellbore points may be placed on both sides of the well points to improve the modeling of near well flow. The parallel near-wellbore points are weighted higher than the quad-tree refinement points but below the well points. An example of a complex well with two levels of quad tree LGR and with one parallel track of grid points on both sides of the well points is depicted in FIG. 6. The grid point generation may also include optimization of grid points for the whole domain according to the weighting. For example, grids points are adjusted and removed to guarantee adjacent well points connected to the formed triangle's edges of the subsequent unconstrained Delauney triangulation described below. Additionally, well grid points may displace other grid points which violate grid quality metrics or the empty circumcircle of the Delauney triangle edges on the well paths. For example, grid points having a lower weighting are removed when the spacing requirement is violated for the region. FIG. 26 illustrates an example of the multi-level grid points for the field grid, reservoir grid, and near-wellbore region generated by placing near-wellbore points on both sides the well points and weighting of the parallel points in accordance with an embodiment of the present invention.

Figure 7:
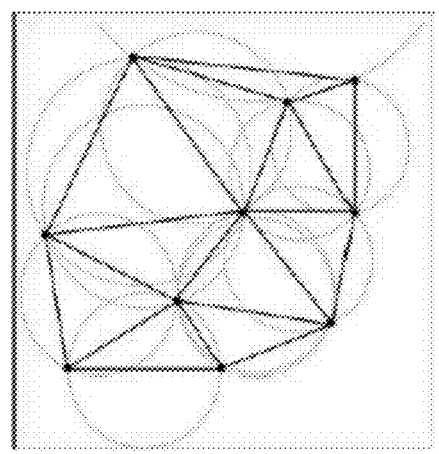
FIG. 7 depicts an example of a Delauney triangulation of a planar point set in accordance with an embodiment of the present invention.
Figure 8:
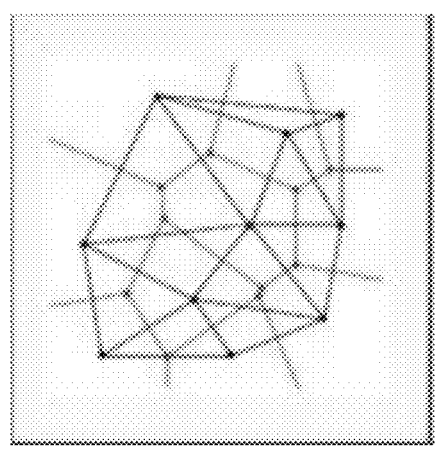
FIG. 8 depicts an example of the perpendicular bisection of the Delauney triangulation of FIG. 7 to generate Voronoi cells in accordance with an embodiment of the present invention.

Next, the generated grid points are used to perform an unconstrained Delauney triangulation of the entire field domain, and the Delauney triangulation is used to generate Voronoi grid cells (block 216). An example of a Delauney triangulation of a planar point set is depicted in FIG. 7. The Delauney triangulation forms the primal grid from which a dual grid for Voronoi cells is generated via bisecting the edges of the triangles of the Delauney triangulation. FIG. 8 depicts an example of the perpendicular bisection of the Delauney triangulation of FIG. 7 to generate Voronoi cells. Perpendicular bisection (PEBI) on the external boundary of the field domain produces infinite rays that interact with the field boundaries, and these intersections are the Voronoi cell vertices on the external boundary of the field domain. The Voronoi cells are used to compute the 2.5 D finite volumes for reservoir simulation. Additionally, in some embodiments, the degenerate edges may be detected and removed to produce a corrected PEBI grid (also referred to as "Voronoi grid" or "Voroni dual grid") suitable for reservoir simulation.

Next, the geometry, properties, and perforations of an unstructured grid (e.g., a 2.5 D unstructured grid) are generated. As shown in FIG. 2, the unstructured grid geometry is generated (block 218). The generation may include projecting the 2D PEBI grid vertex coordinates of the PEBI grid (Voronoi grid) constructed in block 216 onto each horizon of the geocellular model of the structured grid simulation model to compute the depths to the bounding surfaces of each grid layer. This generates a 2.5 D unstructured grid geometry for the entire domain, preserves the layer geometry of the geological model 106 or the structured grid simulation model 108, and accounts for the geological layering of the reservoir. Additionally, in some embodiments, a graph of the connectivity description of the Voronoi cells, the Voronoi vertex coordinates, and the cell to vertices references are also produced.

Additionally, the unstructured grid properties are generated (block 220). The property values of each unstructured cell for each property described in the inputted structured grid geological model 106 or the structured grid simulation model 108 are computed and assigned. In some embodiments, for properties having an integer type, point injection from the structured grid value is applied onto the unstructured grid cell center. In some embodiments, for laterally correlated properties such as porosity, permeability, and other properties, the property values may be interpolated or injected. For uncorrelated properties, such as fracture parameters, the property values are point injected. The computed property maps resemble the input structured grid geocellular model or the structured grid simulation property maps. Additionally, in some embodiments, generating the unstructured grid properties includes volume-in-place correction on a layer by layer basis to closely reproduce the total pore-volume of the original structured grid description.

The unstructured grid perforation is also generated (block 222). The generating includes computing the intersection points of each wellbore trajectory with the finite volume cell faces of all the grid cells penetrated by the wellbore. The entry-exit location may be on any of the vertical or the lateral cell faces of the finite volumes determined by the unstructured grid geometry (generated in block 218). The perforation may be generated as a perforated cell list and the entry-exit coordinates for each perforated cell. In some embodiments, the perforation is stored as a file to form a part of the recurrent data of the simulation model data. This data is used by the parallel reservoir simulator to calculate a well index (WI) for each perforated grid cell which is the connection factor for the well terms in the flow calculation of the reservoir simulation mass and energy balances of the system.

Figure 27:
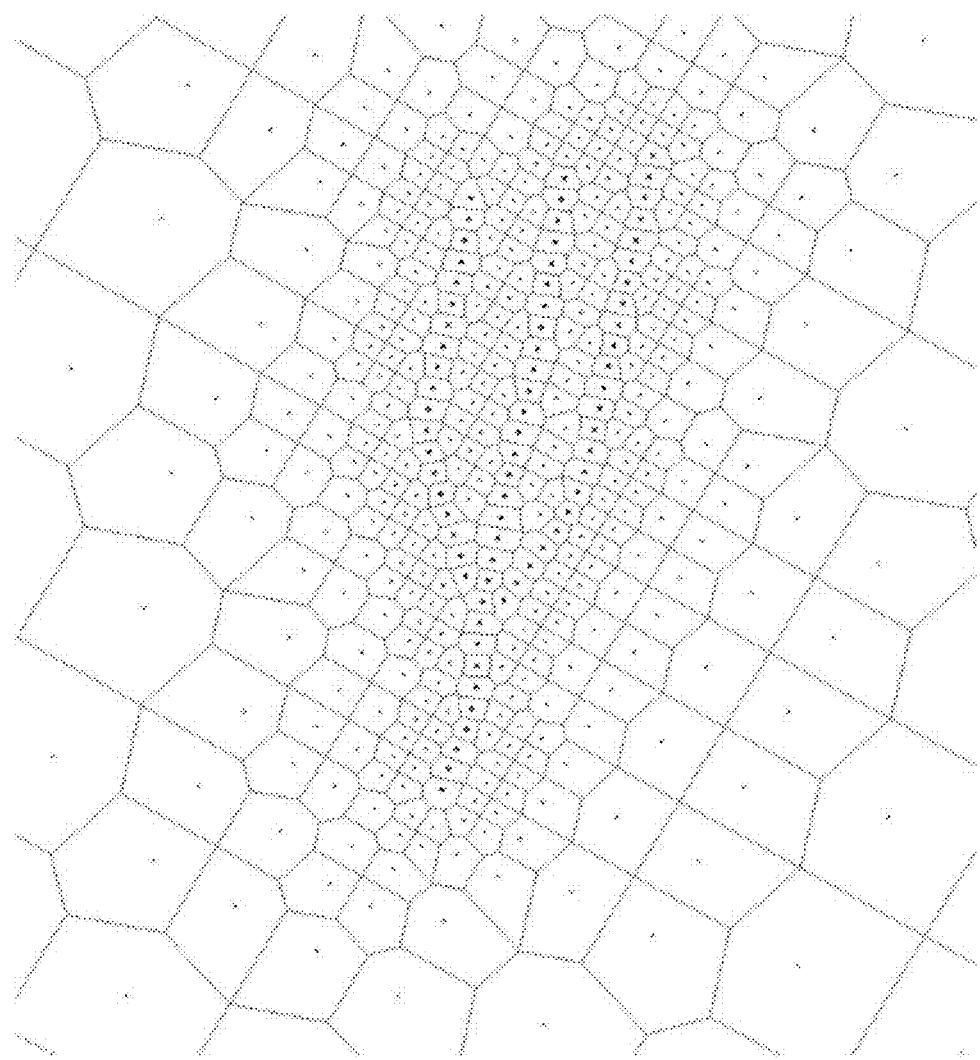
Figure 28:
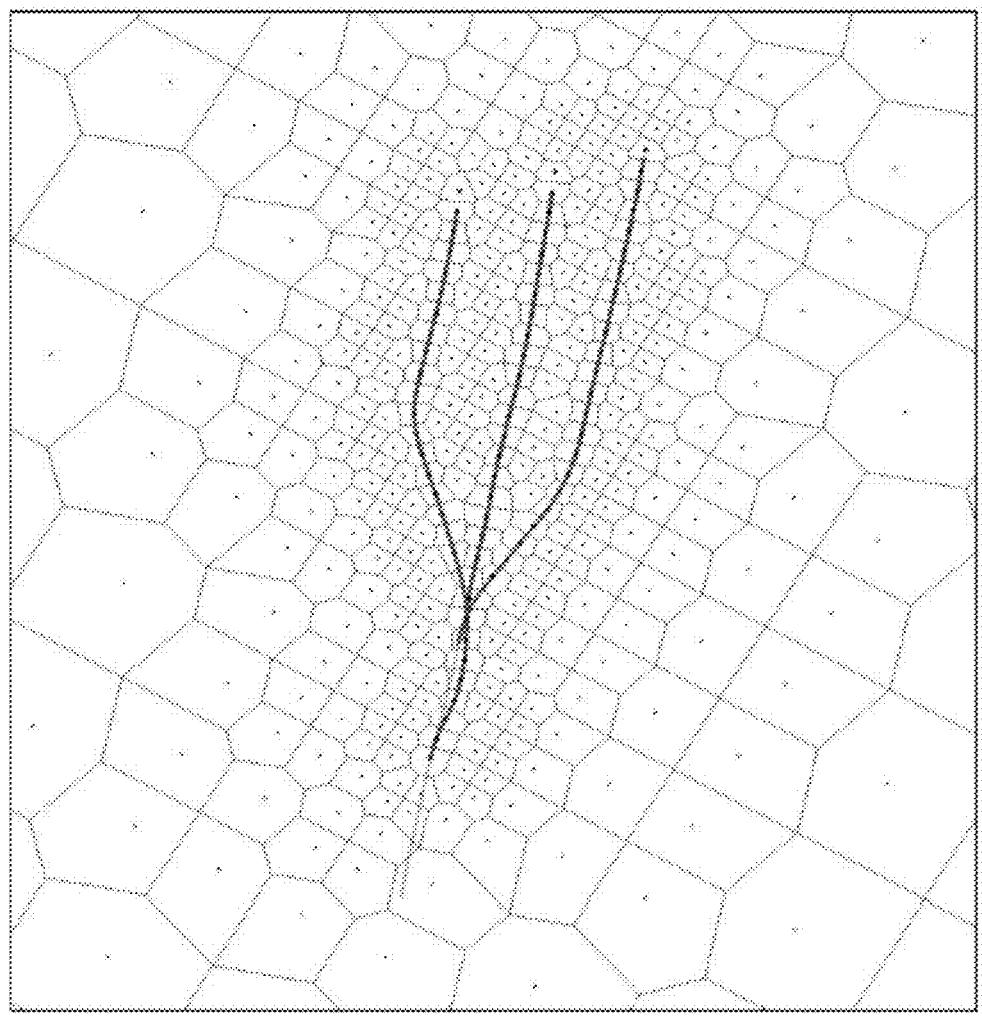
Figure 29:
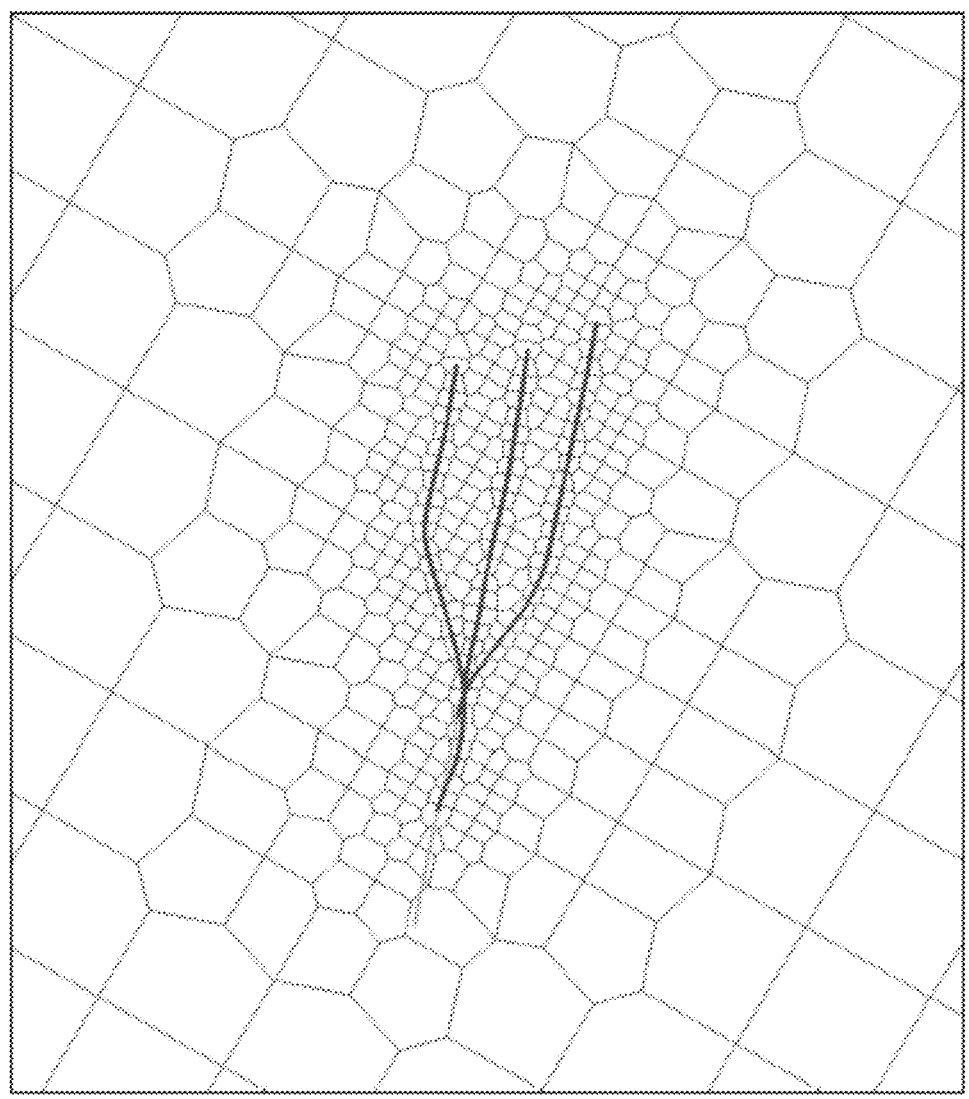
Figure 30:
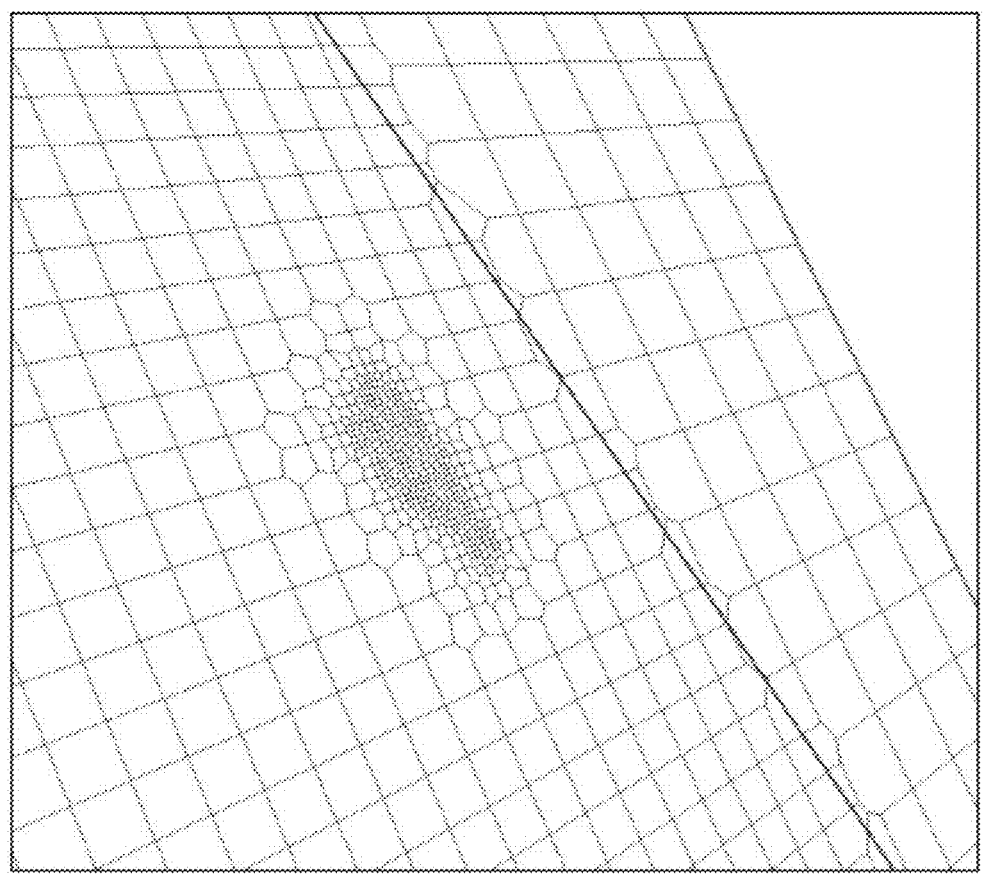
Figure 31:
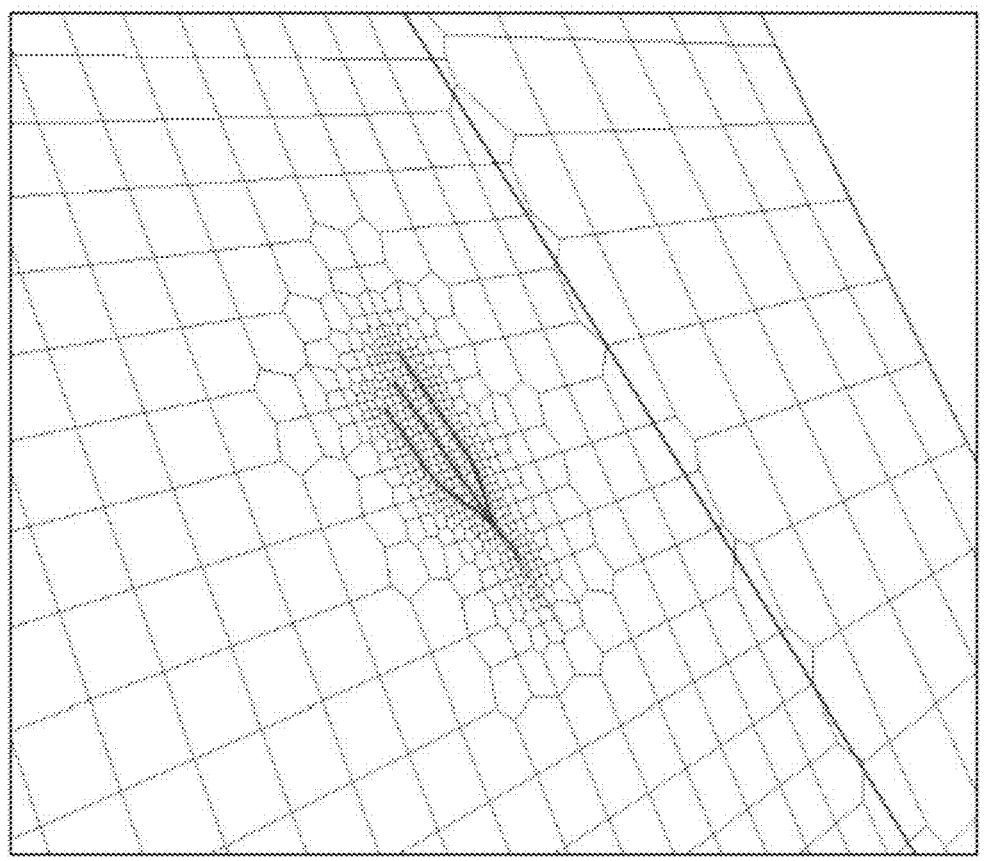

After generating the unstructured grid geometry, properties, and perforations via the parallel unstructured model builder 202, the unstructured grid may be provided to the workflow interface where the gridding results may be analyzed and verified before the unstructured grid is provided to the parallel reservoir simulator 112. The Voronoi cells and grid points of the generated unstructured grid geometry may be displayed by a 2D rendering tool (block 224). In some embodiments, the Voronoi cells and Delauney triangulation grid points may be displayed according to user-selected colors. The displayed Voronoi cells and grid points may enable a user to examine the correlation between the cells and the grid points to verify the generated unstructured grid. The 2D rendering tool of the workflow interface may enable a user to zoom in and out and visually evaluate the Voronoi cells and grid points in relation to the well trajectory and perforation data. FIG. 28 illustrates an example of a zoomed view of Voroni cells and grid points in relation to the well trajectory and perforation data. For example, a user may zoom in to examine the Voronoi cells near a well tree. FIG. 27 depicts an example of a zoomed view of Voroni cells near the well tree of FIG. 25 in accordance with an embodiment of the present invention. In a typical generated unstructured grid and as shown in these figures, for example, the well grid points may be observed exactly at the centers of the Voronoi cells while the Voronoi centers adhere to the complex well trajectory. FIG. 29 illustrates an example of a view of grid cells in relation to the well trajectory and completion without the grid points in accordance with an embodiment of the present invention. Advantageously, the 2D rendering tool of the workflow interface 200 may show the grid points of each sub-step of the grid point generation and optimization, in addition to the showing the Voronoi cells and the merged grid points. Thus, the grid points at each optimizing stage of the grid point optimization may be examined. Furthermore, the grid cell size variation from the field to the reservoir, then to the near-wellbore regions, may be displayed, with or without the well-tree, by the visualization tool. FIG. 30 depicts an example of a 2D view showing the field grid, reservoir grid, and near-well grid without the well tree and FIG. 31 depicts an example of a 2D view showing the field grid, reservoir grid, and near-well grid with the well tree The 2D rendering tool of the workflow interface thus enables validation of the consistency and quality of the multi-level unstructured gridding, validation of the grid point weighting, and visual confirmation of the layout of well grid cells along the well trajectory.

Additionally, the generated unstructured grid properties may be displayed for analysis by an analysis tool of the workflow interface (block 226). The analysis tool may enable validation of the properties generated for the unstructured grid (in block 220). In some embodiments, the analysis tool may display the properties at each unstructured grid cell at each geological grid layer using color mapping. Additionally, in some embodiment the analysis tool includes a dropdown list to enable selection of individual properties for examination. Further, more than one grid layer may be visualized at the same time so that the property values across grid layers may be observed. The analysis tool aids in validating the generating the unstructured grid properties, such as porosity, permeability, fluid saturations and so on. For example, any defects in the near-well unstructured grid may be detected by the analysis tool of the workflow interface 200.

Figure 32:
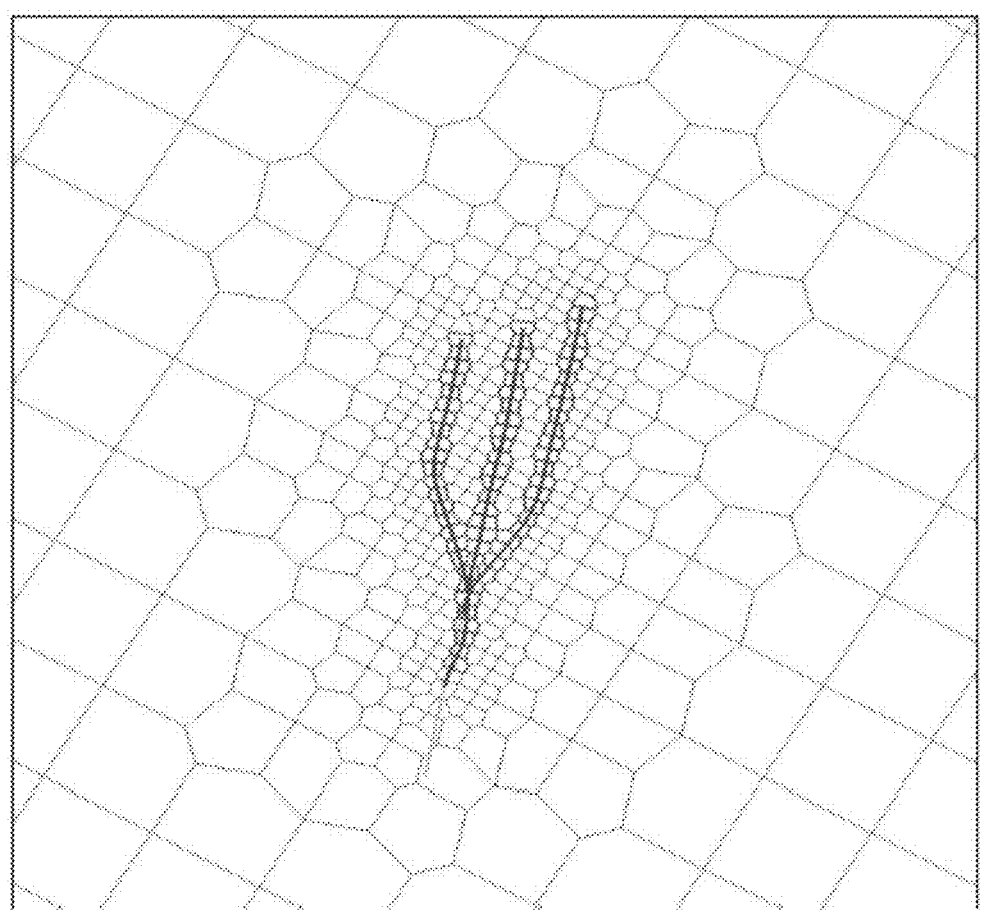
Figure 33:
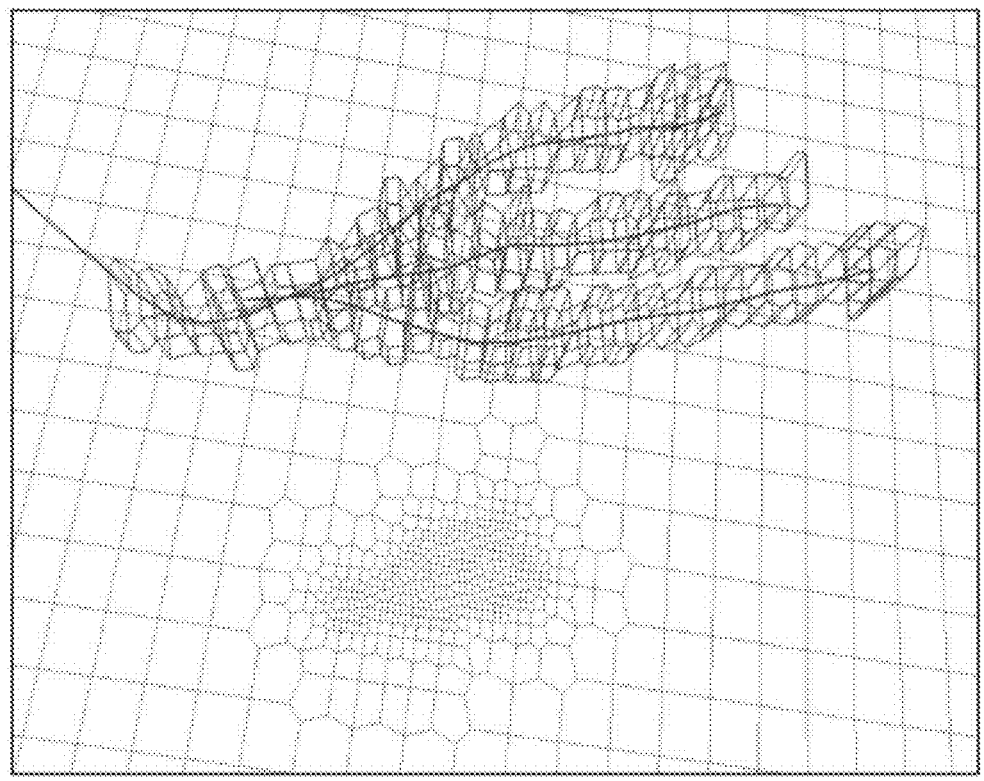
Figure 34:
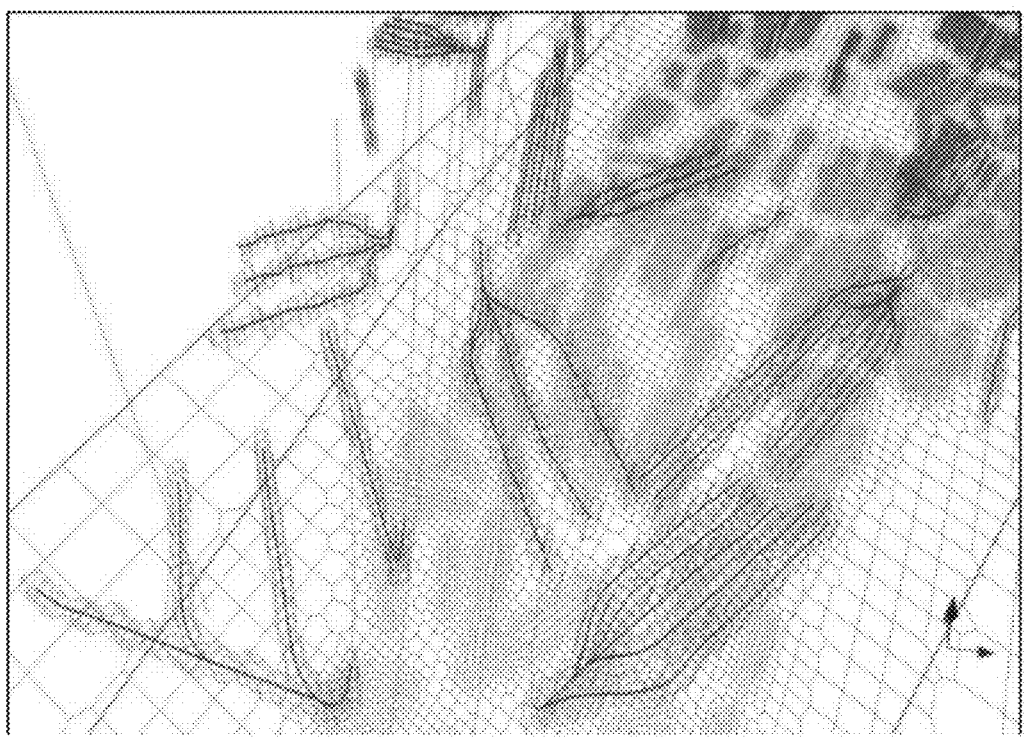

The qualities of the generated unstructured grid perforation data may be displayed for analysis by a perforation analysis tool of the workflow interface 200 (block 228). The perforation analysis tool may draw all of the intersected cells generated by the unstructured grid model builder, and the drawing may be performed based on user-selectable viewing options, such as viewing all wells, groups of wells, or one individual well. The perforated cells may be highlighted in the perforation analysis tool and the exit-entry points of the well trajectory can be displayed. In some embodiments, the intersected cells are drawn along with the corresponding well perforation path in 2D and 3D, and the intersected points on the cell faces may also be shown. FIGS. 32-34 depict various views created by the perforation analysis tool. FIG. 32 illustrates an example of a 2D view showing the perforated cells of well in accordance with an embodiment of the present invention. Additionally, FIG. 33 illustrates an example of a 3D view showing the perforated cells of well in accordance with an embodiment of the present invention. FIG. 34 further illustrates an example of a 3D view of all the unstructured cells perforated by wells within the 3D view in accordance with an embodiment of the present invention. When rendered in 2D, the intersected cells and points may be evaluated against the finite volume cells in the generated unstructured grid geometry and analyzed in the 2D rendering tool. Advantageously, the perforation analysis tool makes the visual examination of the generated perforation data of the unstructured grid easy and interactive.

Figure 9A:
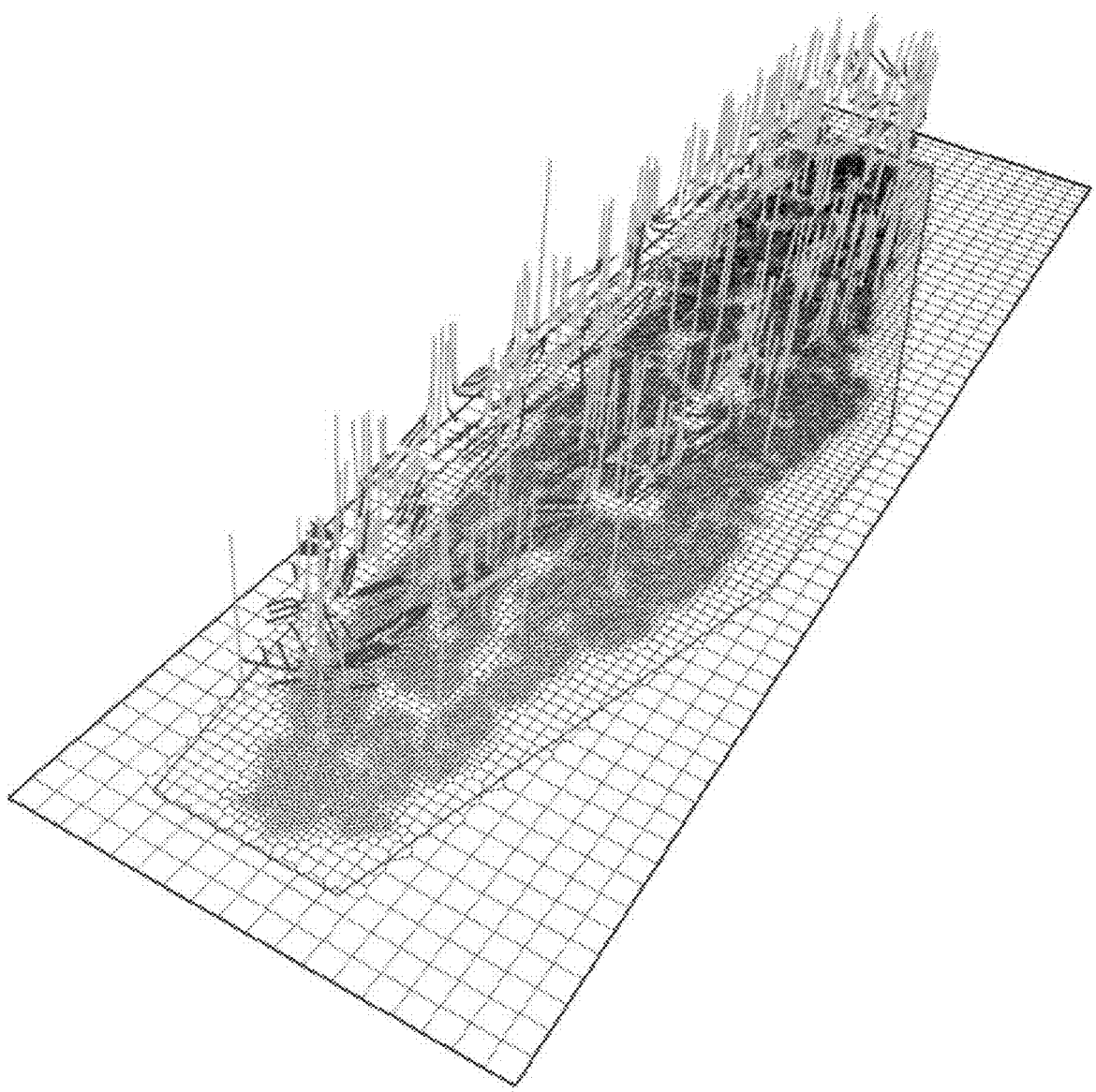
FIGS. 9A and 9B depict an example of a full-field unstructured grid having two hundred and thirty-three history wells in accordance with an embodiment of the present invention.
Figure 9B:
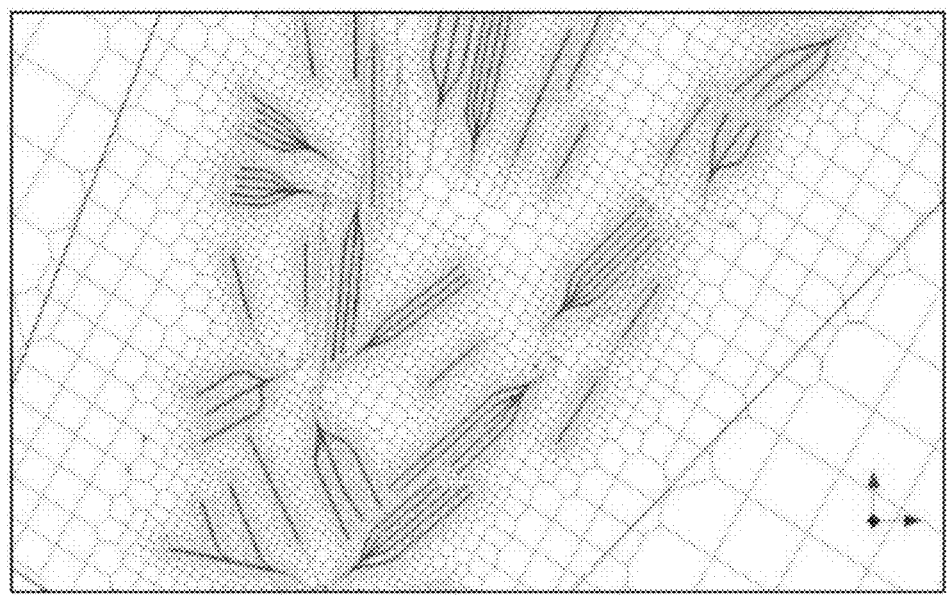

After any further analysis in the workflow interface is complete, the gridding results of the near-well unstructured grid model builder may be outputted from the parallel unstructured grid model builder and provided to the parallel reservoir simulator 112. FIG. 9A depicts an example of a full-field unstructured grid having over two hundred and thirty three history complex wells and generated according to the techniques described herein. FIG. 9B depicts a close-up view of the near-well grids for a window area near the southern tip of the full field unstructured grid of FIG. 9A.

Figure 10A:
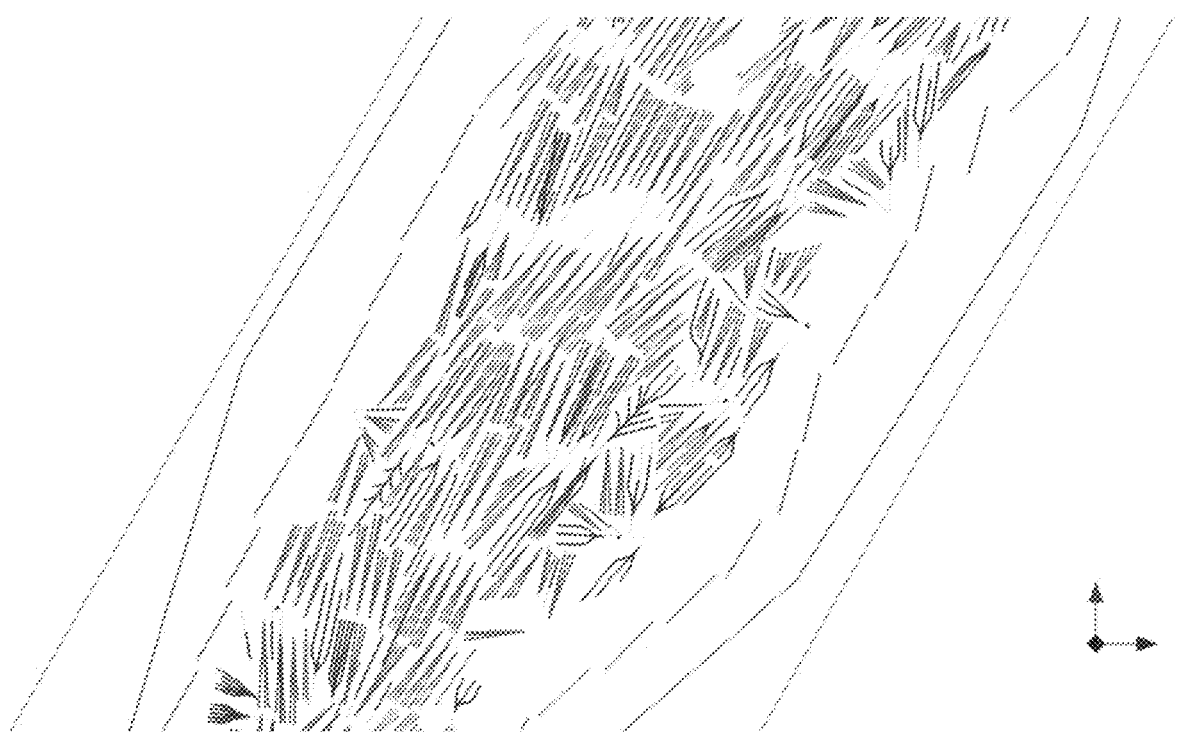
FIGS. 10A and 10B depict a close-up 2D view of the complex wellbores and the corresponding near-well grids respectively for a window area near the middle part of a full field unstructured grid with 233 history complex wells and 395 future complex wells in accordance with an embodiment of the present invention.
Figure 10B:
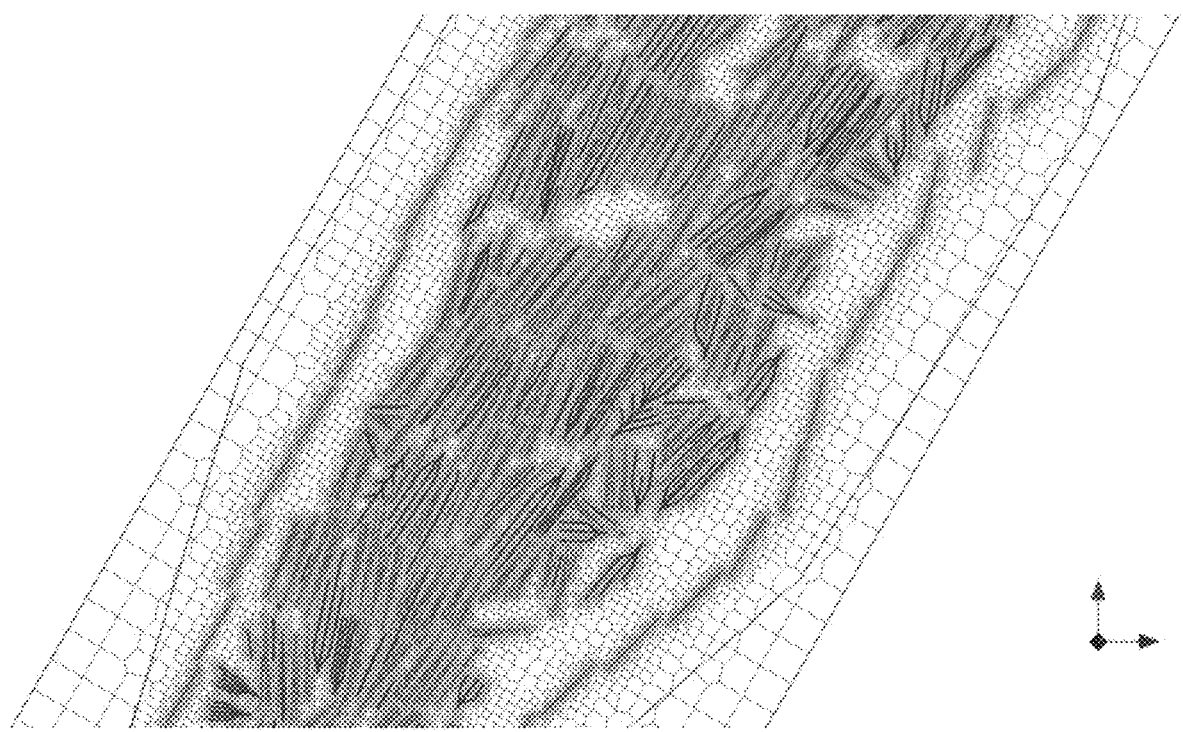

Additionally, FIG. 10A depicts a close-up 2D view of the complex well bores for a window area near the middle part of the full field unstructured grid having two hundred and thirty three history complex wells and three hundred and ninety five future complex wells. FIG. 10B depicts a close-up 2D view of the corresponding near-well grids for a window area near the middle part of the full field unstructured grid having two hundred and thirty three history complex wells and three hundred and ninety five future complex wells. In some embodiments, MODIFY regions are constructed by a MODIFY unstructured region data constructor (block 230) from converted data or from user selections. As used herein, the term "MODIFY" relates to region data that is a part of MODIFY statements used by simulation engineers to specify cell lists to apply property modifiers to update reservoir model data for history matching or sensitivity study purposes. In some embodiments, the MODIFY unstructured region data constructor may provide an interface for converting a MODIFY region from structured grid format to unstructured grid format. Additionally, in some embodiments the MODIFY unstructured region data constructor also provides an interface for enabling a user to select unstructured grid cells or regions directly from the scene and build unstructured region data visually. The MODIFY unstructured region data constructor provides for conversion from a region formats between structured grids and unstructured grids. In some embodiments, for example, MODIFY statements are not used in the parallel reservoir simulator 112 and the region format conversion is not used. The MODIFY unstructured region data constructor enables porting of the history match work from the structured grid to the near-well unstructured grid. For example, when conducting history match in the unstructured grid, the unstructured MODIFY region data may be constructed directly via the interface. The unstructured region data may also be used when the unstructured gridding workflow is obtained directly from the geological model 106. The interface of the unstructured gridding MODIFY unstructured region data constructor enables selection of groups of grid cells (e.g., via "rubber-band selection"). For example, a group of cells in 2D may be selected, and a 3D box type region is constructed after the 3D layer range for the selected cells is specified. The created region is then used as the location for which the simulation MODIFY conditions and expressions are applied.

Advantageously, the workflow interface 200 and the parallel unstructured grid model builder 202 described above provide an easy and communicative workflow for processing complex reservoir and well geometry. For example, in field-scale reservoir simulation, the number of complex MRC wells can range from the several hundred to several thousands. Before building the unstructured grid on all the reservoir and complex wells in the field, the workflow interface 200 and the parallel unstructured grid model builder 202 enable selection of a small group of wells and generation of unstructured grids on the selected wells. This results in easier and faster reservoir simulation with higher quality. By simplifying the unstructured grid complexity the compatibility check of the well data, geological model, regions of interest, and other gridding inputs may be performed faster. For example, the grid size specified on the regions of interest may not be compatible and coordinated; thus, the grid model builder can quickly generate unstructured grids to tune the gridding control data. The unexpected grid resolution can be determined quickly as compared to building the full-field model completely on all reservoirs and wells. After initial building is complete, the unstructured grid may be verified in the workflow interface and provided to the parallel reservoir simulation for a trial simulation. After the trial simulation, all reservoir and wells can be incorporated in a complex field-scale unstructured grid having a longer build time.

It should be appreciated that the workflow interface 200 and parallel unstructured grid model builder 202 may generate unstructured grids on all the reservoirs and wells in a field but may also build the unstructured grid only on a portion of the field, such as a particular reservoir with a subset of the included wells. Moreover, by building an unstructured grid only on a portion of the field, validation of the visualized 3D well data and setting of the proper gridding options is easier for a user. Moreover, defects may be more easily detected and resolved by reviewing the unstructured grid geometry, properties, and perforation data in the workflow interface 200. Advantageously, the workflow interface 200 and parallel unstructured grid model builder 202 speed up the building time of full-field model building having large numbers of MRC wells and makes large scale simulation of unstructured grids with high resolution near wellbore modeling efficient and possible.

FIG. 3 depicts a block diagram of the parallel reservoir simulation 112 in accordance with an embodiment of the present invention. As described above, the near-well unstructured grid from the near-well unstructured grid model builder 110 is provided to the parallel reservoir simulation 112. In some embodiments, the parallel unstructured grid reservoir simulation may include a sequence of time steps over the history match period, the prediction period, or both. As mentioned above, the parallel reservoir simulator may be executed on HPC cluster, e.g., an HPC cluster having several computing nodes each having multiple CPUs, with or without accelerator devices such as GPGPUs or MIC.

The parallel reservoir simulation 112 may receive, as input, the unstructured grid as constructed by the unstructured grid model builder (block 300). In some embodiments, the input process for the parallel reservoir simulation 112 may be a data parallel reader such that each process of the assigned group of processes read a partition of nearly equal subset of grid cell information for further processing. In such embodiments, during this process, the grid cells which have less than minimum thickness (a pinch-out cell) or less minimum pore-volume or porosity (a dead cell) are flagged as null cells. The grid cells which are not null cells may be the active cells included in the reservoir simulation step.

Next, the data parallel construction of the 3D distributed connectivity graph for the active cells is performed (block 302). The graph may be distributed (e.g., by load-balancing) across the assigned group of compute processes for running parallel reservoirs simulation. In some embodiments, load balancing may be based on the equal division of global active cells into the individual compute processes, such that each process contains a contiguous subdomain of active grid cells for the simulation. Additionally, the subdomain boundary cell faces are minimized to reduce network communication requirements for the processors (and computing nodes) of a parallel computing environment, such as an HPC cluster. Additionally, a connection factor is also calculated that prescribes the strength of each connection based on the individual cell permeability tensor and geometry of the neighboring cell and cell faces. In some embodiments, the connection factor may also be referred to as "transmissibility."

Next, a reservoir simulation is performed (block 304) by the parallel reservoir simulation 112. For example, in some embodiments the reservoir simulator uses a unified unstructured data infrastructure, formulation, and linear solver for both structured grid and unstructured grid simulation. Finally, the simulation results may be outputted (block 306), such as by an output process of the parallel reservoir simulation 112. The simulation results may be written to a non-volatile storage (e.g., a hard disk) for post processing and analysis. In some embodiments, the output process is a parallel data write such that each process of the assigned group of compute processes writes a partition of nearly equal subset of grid cell information to disk storage.

As shown in FIG. 1, the output from the parallel reservoir simulator 112 may be provided to the AHM tool 114 and the result viewer 116. The AHM tool 114 may use the MODIFY statements to perform model updates for the reservoir history match processing or to perform sensitivity analysis over a range of parameters, such as to explore the response surface of the simulation model. Various types of history matching may be used, including history matching that uses the MODIFY statements for model updating. As mentioned above, the AHM tool 114 may create multiple simulation datasets that can be submitted to the parallel reservoir simulator 112 in parallel (e.g., so that each simulation is a parallel computer job running on the computing nodes of a computing environment, such as an HPC cluster).

As also shown in FIG. 1 and mentioned above, the output from the parallel reservoir simulator 112 may also be provided to the 3D unstructured grid reservoir simulation results viewer and data analyzer 116. The 3D unstructured grid reservoir simulation results viewer and data analyzer 116 may include an import engine to input the simulation results files for post simulation analysis and visualization. As mentioned above, the results of such analysis may be provided to update the geological model 106, to the near-well unstructured grid model builder 110 for local regridding to generate additional MODIFY statements, or to the parallel reservoir simulator 112 for additional simulation. It should be appreciated that this iterative workflow may continue until the desired history matching and evaluation have been completed.

Figure 11:
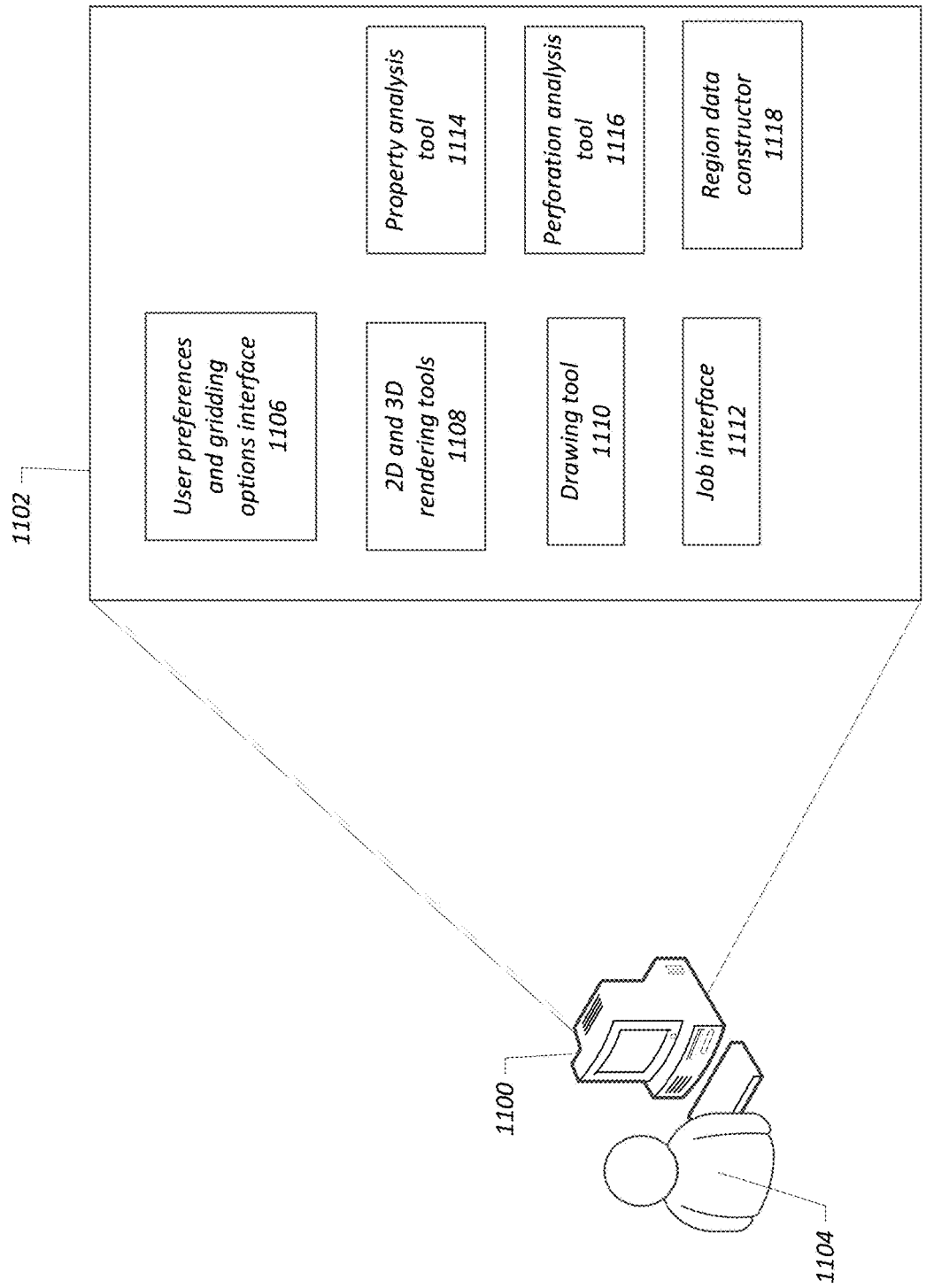
FIG. 11 is a schematic diagram of a computer implementing a workflow interface in accordance with an embodiment of the present invention.

FIG. 11 depicts a computer 1100 implementing the workflow interface 200 in a graphical user interface 1102 in accordance with an embodiment of the present invention. As shown in FIG. 11, a user 1104 may interact with the computer 1100 and the graphical user interface 1102. In some embodiments, the workflow interface 200 may be implemented on a computer 1100. However, in other embodiments, the graphical user interface 1102 may be implemented on multiple computers in communication with each other over a network. Such embodiments may include, for example, a client/server arrangement of computer, a peer-to-peer arrangement of computers, or any other suitable arrangement that enables execution of the graphical user interface 1102. In some embodiments, the graphical user interface 1102 may implemented as a computer program stored on a memory of the computer 1100 and executed by a process of the computer 1100.

FIG. 11 illustrates various components of the graphical user interface 1102 that provide the functionality described above with regard to the workflow interface 200. It should be appreciated that the graphical user interface 1102 may be implemented using various user interface elements, such as windows, icons, controls such as buttons, switches, sliders, and so on, dialog boxes, tabs, and any other suitable user interface elements. As shown in FIG. 11, the graphical user interface 1102 includes a user preferences and gridding options interface 1106. As described above, the user preferences and gridding options interface 1106 enables a user to specify various user preferences and gridding options, such as the inputs to the near-well unstructured grid model builder 110. The gridding options may include, for example, the grid size, the field rectangle polygon, and other options.

The graphical user interface 1102 also includes 2D and 3D rendering tools 1108 to render various data visually and display the visualizations to the user. For example, as described above, the 2D and 3D rendering tools 1108 may visualize the well trajectory and completion data in both 2D and 3D and the field polygon. Moreover, visualizations may use user-selected colors to display different types of data. Additionally, as described above, the 2D and 3D rendering tools 1108 may enable a user to zoom in and zoom out on various wells, jump to different wells, rotate and pan the camera, and provide other viewing controls. The graphical user interface 1102 also includes a drawing tool 1110 that enables a user to define regions of interest of the field by drawing a reservoir polygon. Such drawing functionality may be implemented by enabling a user to define points of a polygon and connect the points, using, for example, rubber-band selection.

As also mentioned above, the graphical user interface 1102 includes a job interface 1112 that enables a user to submit and monitor computing jobs provided to a computing environment, such as an HPC cluster. For example, a user may submit parallel model building jobs for the parallel unstructured grid model builder 202 for execution by the computing environment. The job interface 1112 to queue jobs, view existing jobs, view job status, and so on.

The graphical user interface 1102 also includes a property analysis tool 1114 and a perforation analysis tool 1116. As described above, after building an unstructured grid mode, the geometry, properties, and well perforations of the unstructured grid may be viewed by a user in the workflow interface 200 for verification. The generated unstructured grid geometry may be displayed in the 2D and 3D rendering tools 1108, For example, the 2D rendering tool may display the generated Voronoi cells and grid points. The property analysis tool 1114 may display the properties of the generated unstructured grid by using, for example, a color-mapping scheme to display the properties at each unstructured grid cell and at each geological grid level. The color mapping scheme may be a default scheme or a user-selected color mapping scheme. Additionally, the property analysis tool 1114 may provide a dropdown list or other user interface element for selection of individual properties. Additionally, the property analysis tool 1114 may visualize multiple grid layers at the same time to enable viewing of property values across all grid layers.

As described above, the perforation analysis tool enables a user to view perforation of all wells, groups of wells, or individual wells based on user-selectable viewing options. The perforation analysis tool 1116 displays the perforated cells in highlights (e.g., in a specific color) and may optionally display the exit-entry points of the well trajectory. Moreover, the perforation analysis tool 1116 may draw intersected cells along with the corresponding well peroration path in 2D and 3D, and may also show the intersection points on the cell.

The graphical user interface 1102 may also include a region data constructor 1118 for converting a first region format (e.g., a structured grid format) to a second region format (e.g. an unstructured grid format). As described above, in some embodiments, the region data in structured grid format may be converted to MODIFY region data as part of MODIFY statements used by a parallel reservoir simulator (e.g., the parallel reservoir simulator 112.). The region data constructor 1118 may enable a user to select unstructured grid cells or regions directly from the unstructured grid and build the unstructured region data visually. The region data constructor 1118 may enable a user to select grid cells via rubber-band selection and then select a 3D layer range for construction of a 3D region for format conversion.

Figure 12A:
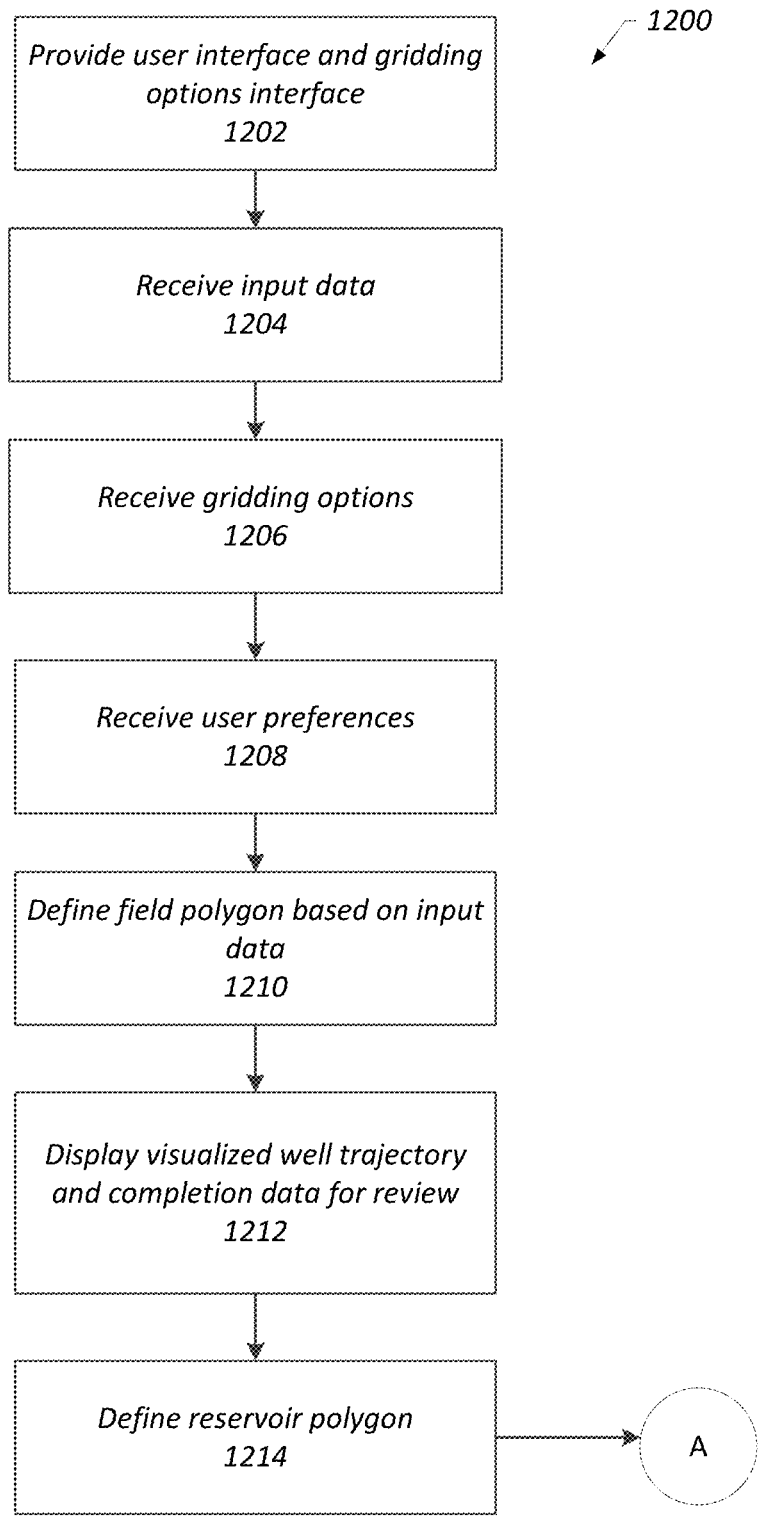
FIGS. 12A and 12B are block diagrams of a process of the workflow interface in accordance with an embodiment of the present invention.
Figure 12B:
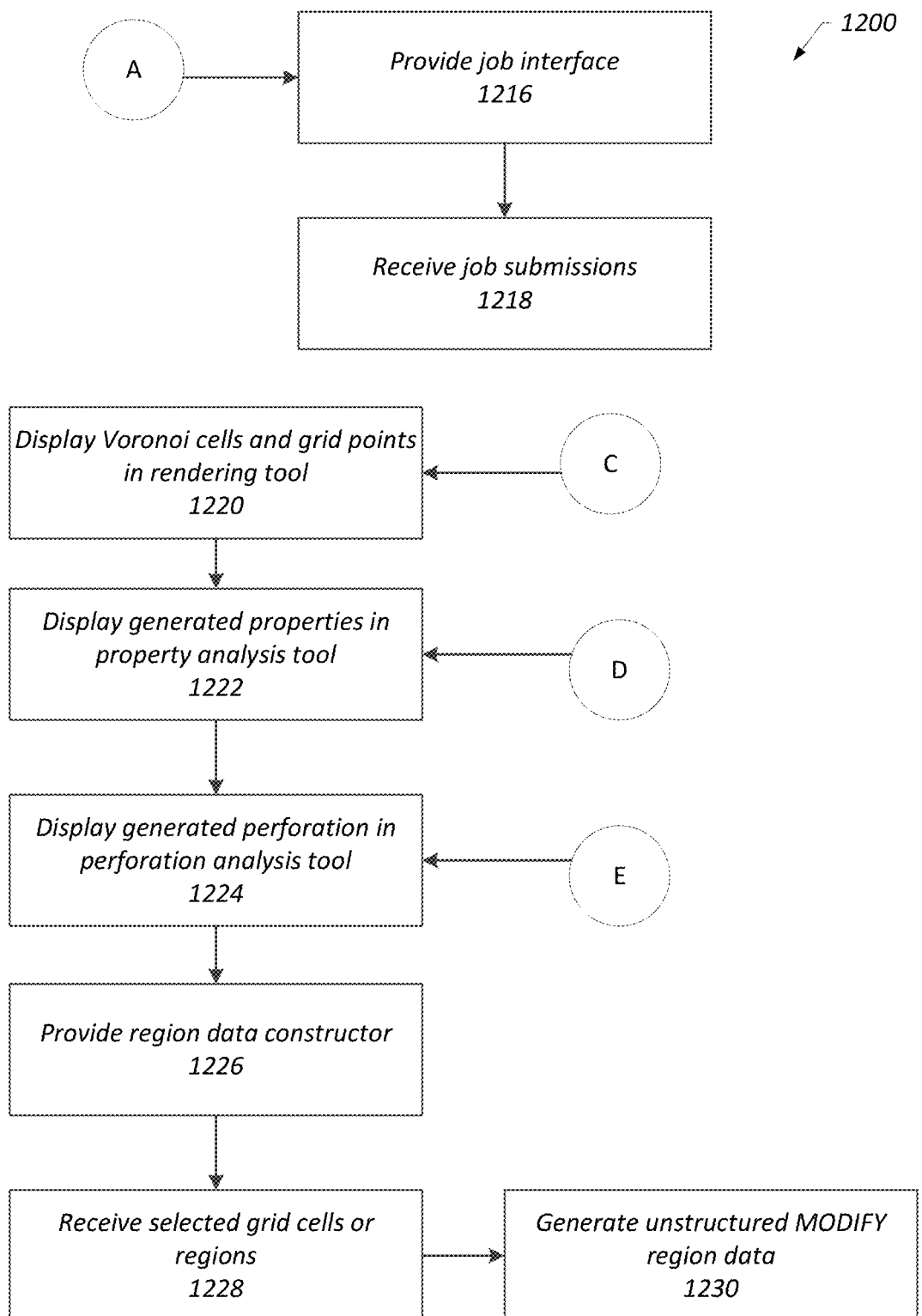
Figure 13A:
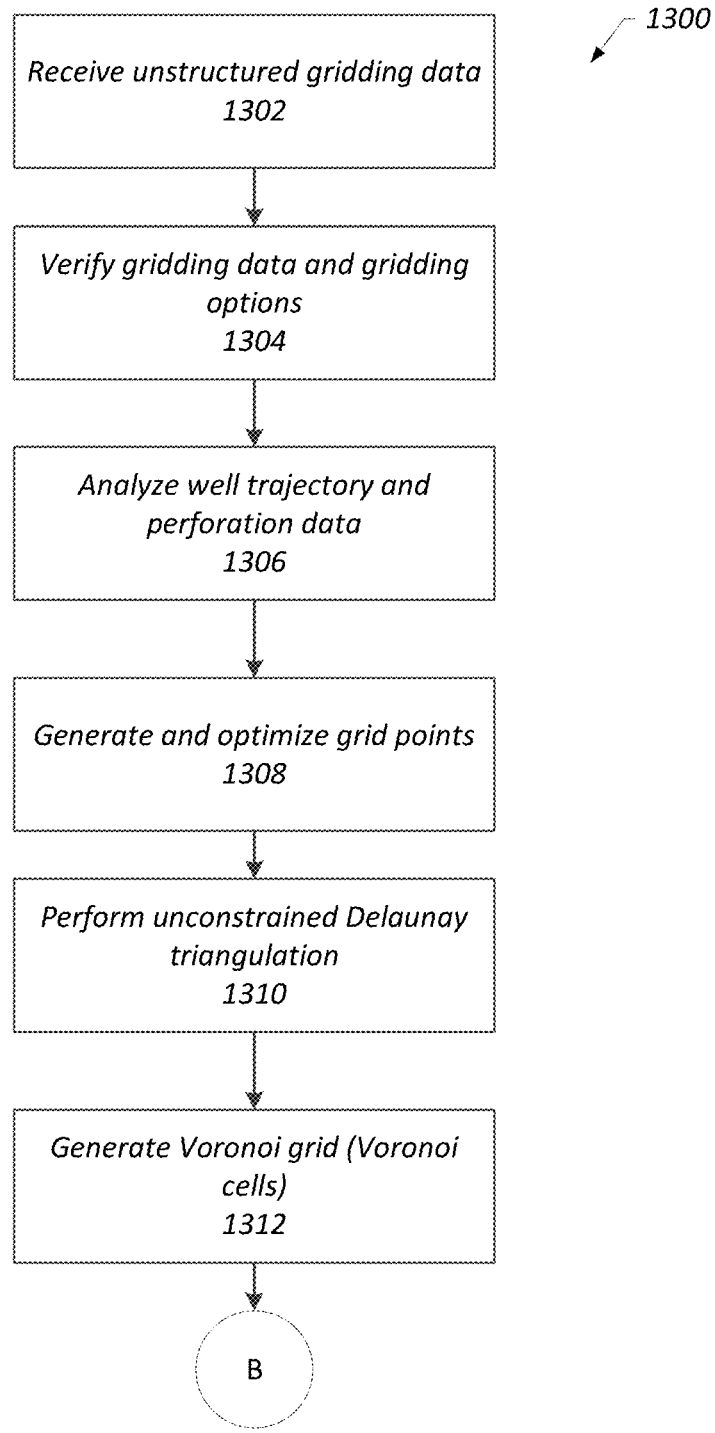
FIGS. 13A and 13B are block diagrams of a process of the workflow interface in accordance with an embodiment of the present invention.
Figure 13B:
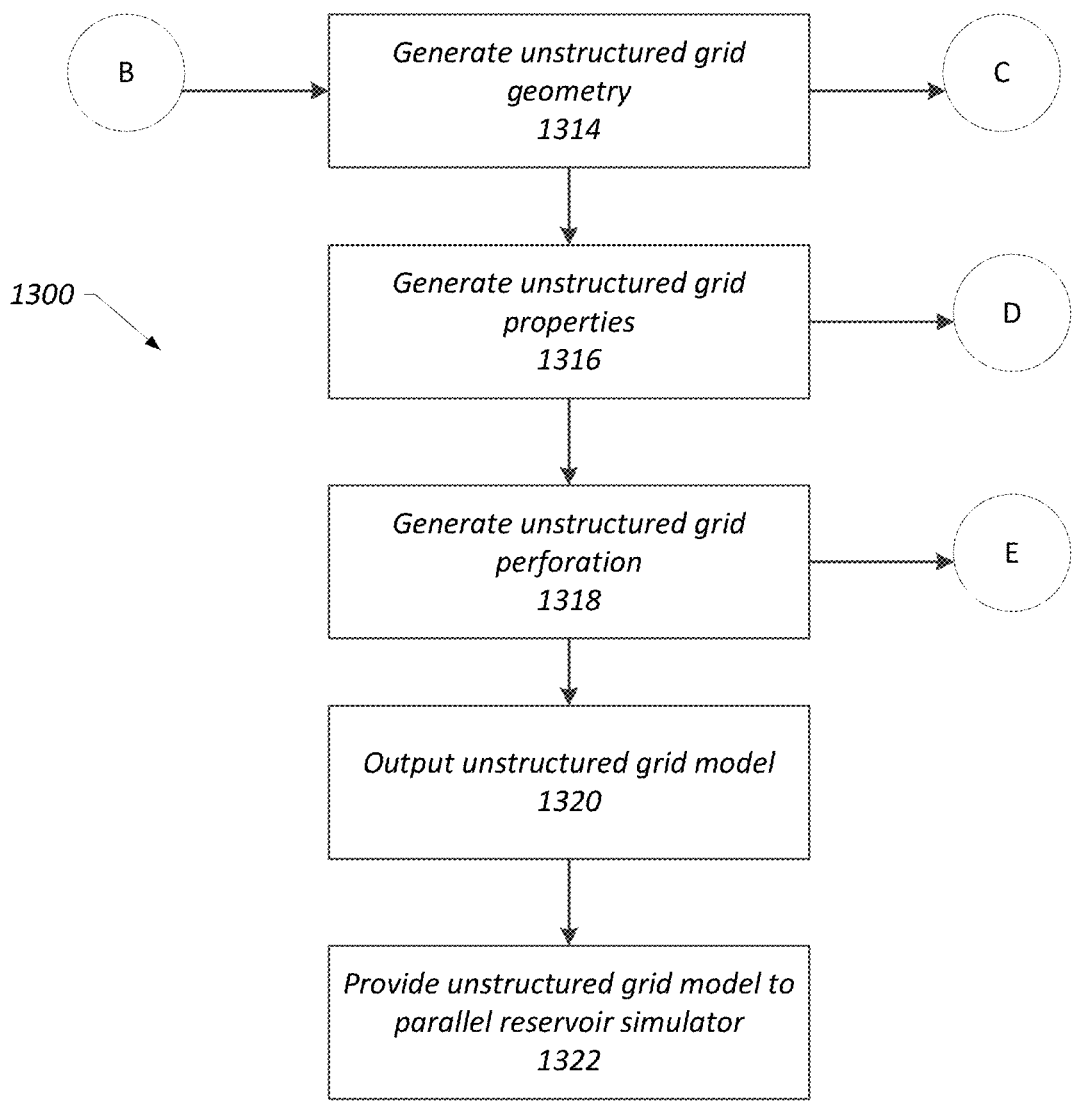

FIGS. 12 and 13 depict operation of the workflow interface 200 and the parallel unstructured grid model builder 202 in accordance with an embodiment of the present invention. FIGS. 12A and 12B depict a process 1200 of the workflow interface 200, and FIGS. 13A and 13B depict a process 1300 of the parallel unstructured grid model builder. With regard to the workflow interface 200, a user preferences and gridding options interface may be provided (block 1202). Next, input data specified by the user may be received (block 1204). As described, the input data may include existing well trajectory and completion data, future well data (e.g., future well trajectory and completion data), a structured geological model, a structured grid simulation model, or any combination thereof.

Next, gridding options may be received in the workflow interface (block 1206). For example, as described above, a grid size and other gridding options may be specified by the user. Additionally, user preferences may be received (block 1208). Such user preferences may include, for example, customization of the graphical user interface implementing the workflow interface, colors for various rendered visualizations provided in the workflow interface, and other user preferences. Next, the field polygon is defined based on the input data (block 1210). For example, the field polygon may be based on some or all of the different types of input data provided via the workflow interface.

Next the visualized well trajectory and completion data are displayed for review (block 1212). As mentioned above, in some embodiments, the well trajectory and completion data are visualized in a 2D and 3D rendering tool that enables both 2D and 3D viewing of the data in the visualization. Next, a reservoir polygon may be defined (block 1214) based on actions by the user. In the case of multiple reservoirs in the field, multiple reservoir polygons may be defined. As described above, after viewing the field polygon, the user may create a reservoir polygon or multiple reservoir polygons, each may optionally contain one or more regions of interest. Each region of interest may have a user-specified grid size smaller than the reservoir grid size.

As shown by connection block A, FIG. 12B depicts further details of the process 1200. After defining a reservoir polygon, a job interface is provided in the workflow interface (block 1216). As described above, the job interface enables a user to submit jobs for the parallel unstructured grid model builder and monitor submitted jobs. Thus, job submissions may be received (block 1218). As described above, the job submissions are provided to the parallel unstructured grid model builder for generation of a near-well unstructured grid.

FIG. 13A depicts a process 1300 of the parallel unstructured grid model builder in accordance with an embodiment of the present invention. As shown by connection block B from FIG. 13B, unstructured gridding data for submitted jobs is received (block 1302). The gridding data and associated gridding options (e.g., gridding options entered by a user and received in the workflow interface) are verified (block 1304). Next, the well trajectory and perforation data is analyzed (block 1306). As described above, the analysis may include determining compatibility between well trajectory data and perforation data and sampling well trajectory points contained by perforation start and end points.

Following the analysis, grid points in each region of interest are generated and optimized (block 1308). As described above, the optimization may include weighting various grid points, replacing grid points, and placing grid points to provide an optimal grid layout for the whole domain. Next, an unconstrained Delauney triangulation of the field domain is performed using the generated grid points (block 1310). After the Delauney triangulation, a Voronoi grid (which may also be referred to as a PEBI grid) having Voronoi cells is generated (block 1312), such as via perpendicular bisection of the triangle edges of the Delauney triangulation. As illustrated by connection block B, the process 1300 is further depicted in FIG. 13B.

As shown by connection block B and as illustrated in FIG. 13B, the process 1300 then generates an unstructured grid geometry (block 1314), generates unstructured grid properties (block 1316), and generates unstructured grid perforation (1318). After generating the geometry, properties, and perforation for the unstructured grid, the unstructured grid may be output (block 1320). As described above, the unstructured grid may then be provided to a parallel reservoir simulator for further processing (1322).

As described, generating unstructured grid geometry (block 1314) may include generates the 2.5 D unstructured grid geometry for the entire domain. Additionally, as shown by connection block C, the unstructured grid geometry may be displayed by the workflow interface process. With reference to FIG. 12B and as shown by connection block C, the workflow interface process 1200 may display Voronoi cells and grid points in a rendering tool (block 1220). For example, a user may use the rendering tool to examine the correlation between the Voronoi cells and the triangulation grid points.

As mentioned above and as shown in FIG. 13B, the process 1300 includes generating unstructured grid properties (block 1316). As shown by connection block D, the unstructured grid properties may be displayed by the workflow interface process. As shown in FIG. 12B and by connection block D, the workflow interface process 1200 may display the generated properties in a property analysis tool (block 1222). As shown in FIG. 13B and as mentioned above, the process 1300 includes generating unstructured grid perforation (block 1318). As described above and as shown by connection block E in FIGS. 13B and 12B, the unstructured grid perforation may be displayed by the workflow interface process. As shown in FIG. 12B, the workflow interface process may display the generated unstructured grid perforation in a perforation analysis tool (block 1224).

Additionally, as described above, the workflow interface may include a region data constructor. Thus, in some embodiments and as depicted in FIG. 12B, a region data constructor may be provided in the workflow interface (block 1226). Selected grid cells or regions for format conversion may be received (block 1228) and, in some embodiments, unstructured MODIFY region data may be constructed from the selected grid cells or regions (block 1230)

Figure 14A:
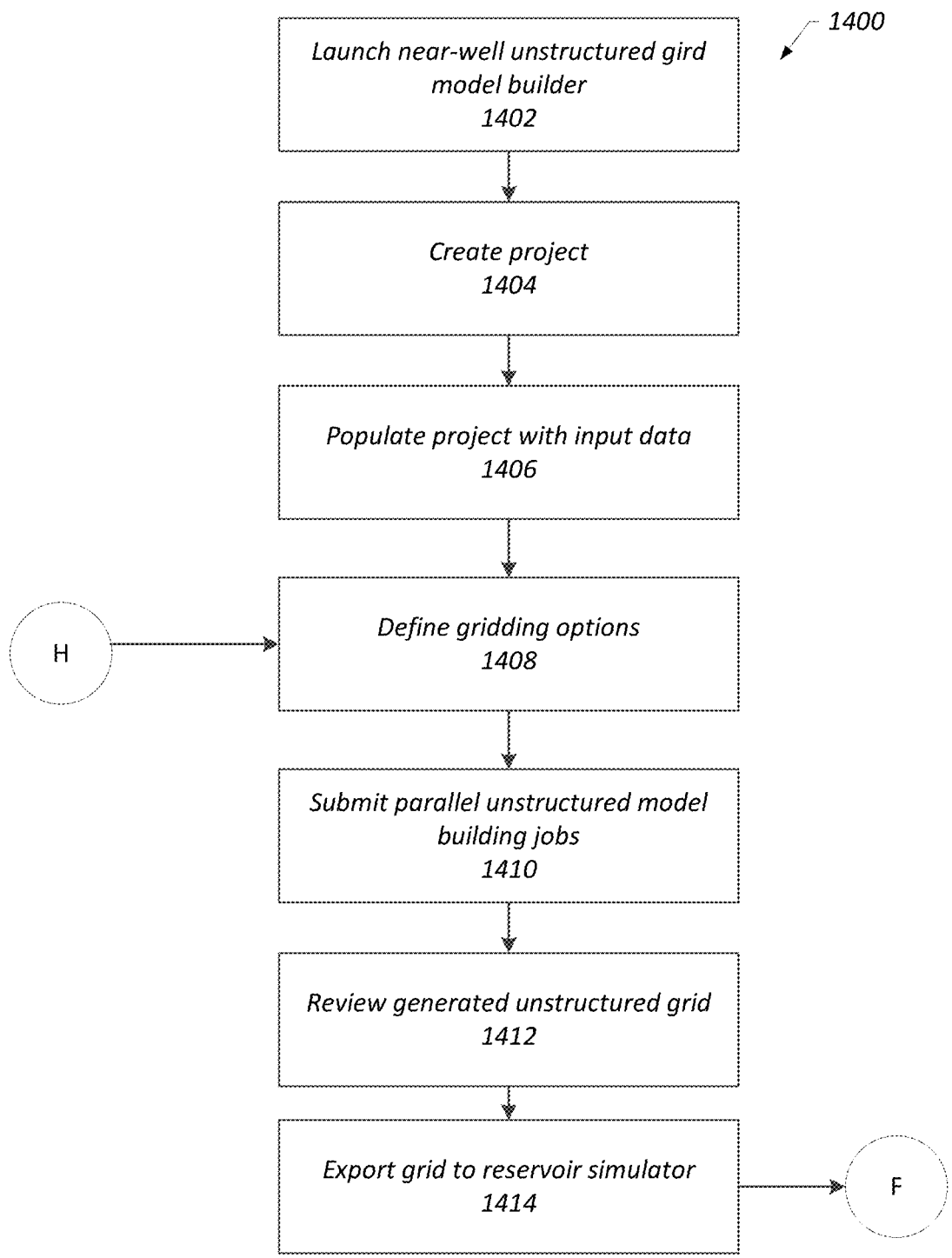
FIGS. 14A and 14B are block diagrams of a process for using the near-well unstructured grid model builder in accordance with an embodiment of the present invention.

FIG. 14 depicts a process 1400 for using the near-well unstructured grid model builder in accordance with an embodiment of the present invention. Initially, a user may launch the near-well unstructured grid model builder (block 1402). For example, after launch a user may be presented with a GUI providing the workflow interface. Next, the user may create a project for the simulation and the near-well modeling (block 1404). The user may then populate the project with input data (block 1408). As described above, the input data may include existing well trajectories and completion data, future well data, a geological model, a structured grid simulation model, or any combination thereof.

The user may then define gridding options (block 1408), such as by specifying the grid size. Additionally, as described above, a user may create a reservoir polygon within a field polygon to define regions of interest. Next, the user may submit parallel unstructured model building jobs to a computing environment (block 1410). For example, in some embodiments, the computing environment may include an HPC cluster and the user may submit cluster jobs for execution by the HPC cluster. After generation of the unstructured grid, the user may review the generated unstructured grid (block 1412). In some embodiments, as described above, the user may view the generated unstructured grid geometry, the generated unstructured grid properties, and the generated unstructured grid perforation in the workflow interface. For example, the user may examine the generated unstructured grid for the grid point density, quality of near-well region representation, smoothness of grid transition, and so on. If the user is satisfied with the generated unstructured grid, the user may export the grid to the parallel reservoir simulator (block 1414).

Figure 14B:
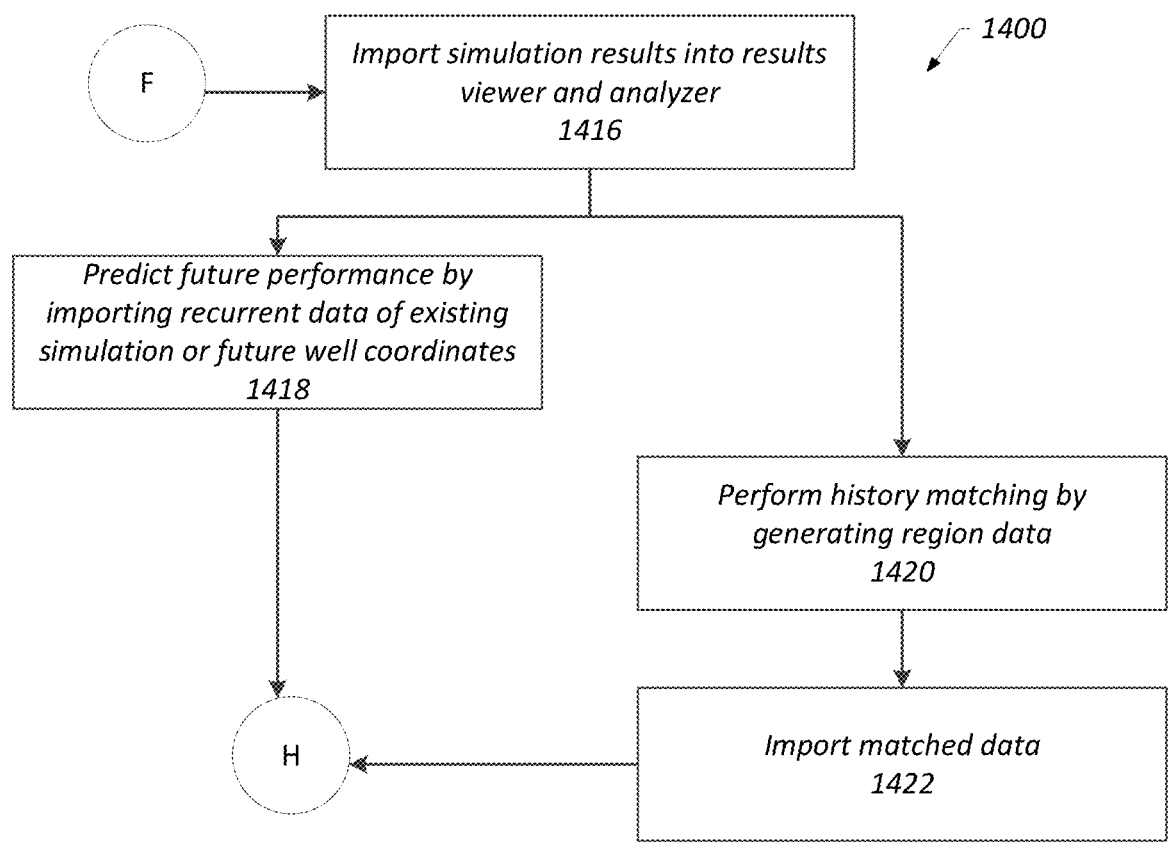

As shown by connection block F, the process 1400 is further illustrated in FIG. 14B. After a reservoir simulation is performed by the parallel reservoir simulator, the user may import the simulation results into the viewer and analyzer (block 1416). The user may then perform further tasks based on additional data input into the process. For example, a user may predict future performance by importing recurrent data of an existing simulation model or the coordinates of future wells (block 1418). As shown by connection block H, the process may then continue with the user defining gridding options and proceeding with additional unstructured grid generation. Additionally, a user may perform history matching by constructing region data (block 1420). For example, MODIFY region data may be constructed for sensitivity analysis and simulation model updating using AHM (assisted history match) tool to match the production history. For an already history matched structured grid model, the matched data may be imported (block 1422) and, as shown by connection block H, the process may continue with the user defining gridding options (block 1406). The structured grid MODIFY data may be generated by the parallel unstructured grid model builder and may be constructed using the workflow interface, as described above.

Figure 15:
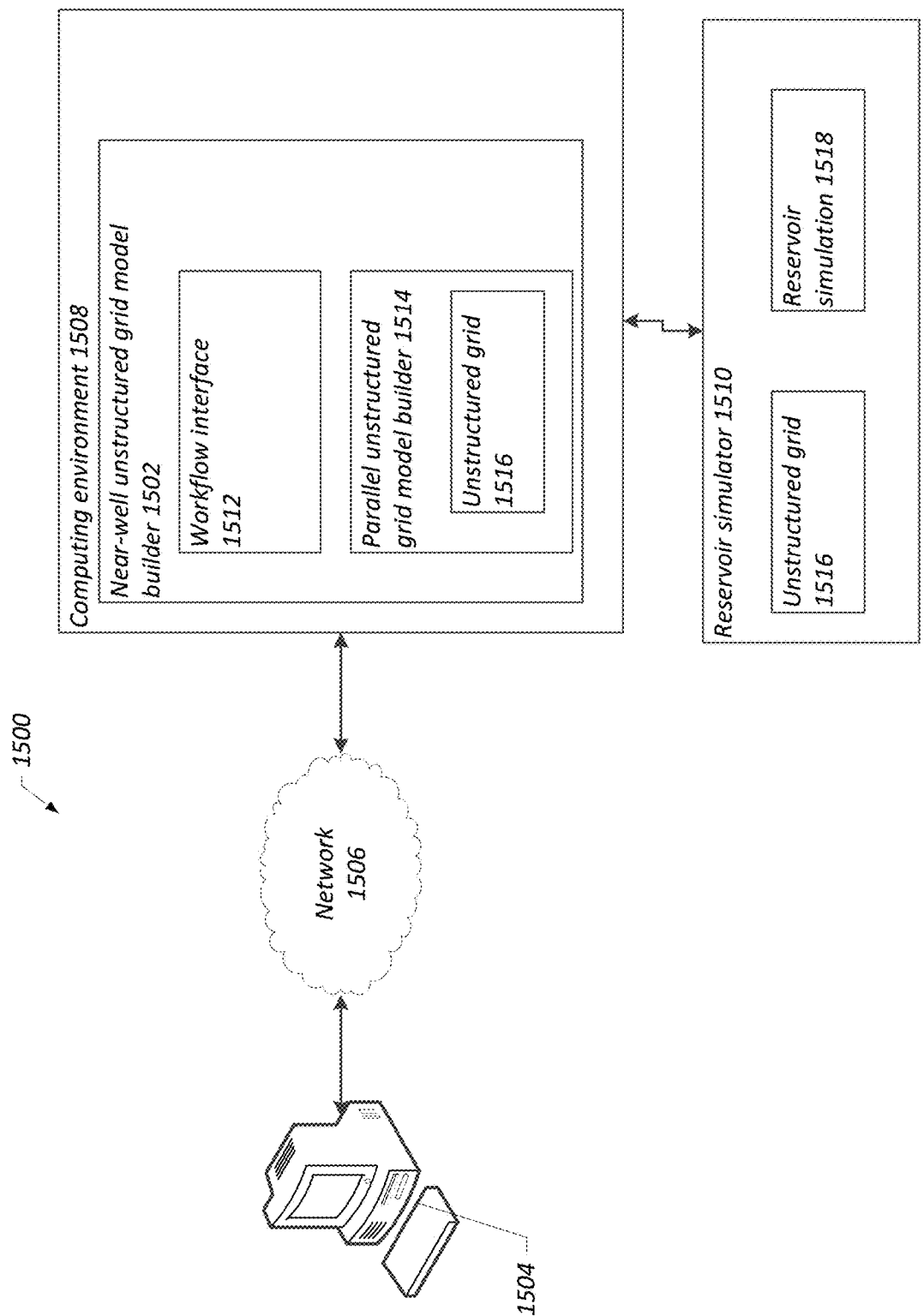
FIG. 15 is a block diagram of a system implementing a near-well unstructured grid model builder in accordance with an embodiment of the present invention.

FIG. 15 depicts a system 1500 implementing a near-well unstructured grid model builder 1502 in accordance with an embodiment of the present invention. The system 1500 includes a client computer 1504, a network 1506, a computing environment 1508, and a reservoir simulator 1510. As shown in FIG. 15, the near-well unstructured grid model builder 1502 includes a workflow interface 1512 and a parallel unstructured grid model builder 1514. The unstructured grid builder 1502 may produce an unstructured grid model 1516, according to the techniques described above. As described above, the unstructured grid model 1516 is provided to the reservoir simulator 1510, and the reservoir simulator 1510 produces a reservoir simulation 1518 based on the unstructured grid. It should be appreciated that, in some embodiments, the reservoir simulator 1510 may be implemented on a computing environment similar to the computing environment 1508.

A user may use the client computer 1504 to access the near-well unstructured grid model builder 1502 over the network 1506. For example, as described above, the workflow interface 1512 may be implemented in a graphical user interface, and the client computer 1504 may be used to access and interact with the graphical user interface. The client computer 1504 may include, for example, laptop computers, desktop computers, tablet computers, or other computers. In some embodiments, the network 1506 may include multiple networks, such as a wireless Ethernet network, a cellular network, or other wireless networks. The computing environment 1508 may include single server (in a discrete hardware component or as a virtual server) or multiple servers. The computing environment 1508 may include web servers, application servers, or other types of servers. Additionally, the computing environment 1508 may include, for example, computers arranged in any physical and virtual configuration, such as computers in one or more data processing centers, a distributed computing environment, an HPC cluster or other configuration. Such configurations may use the network 1506 for communication or may communicate over other networks.

Figure 16:
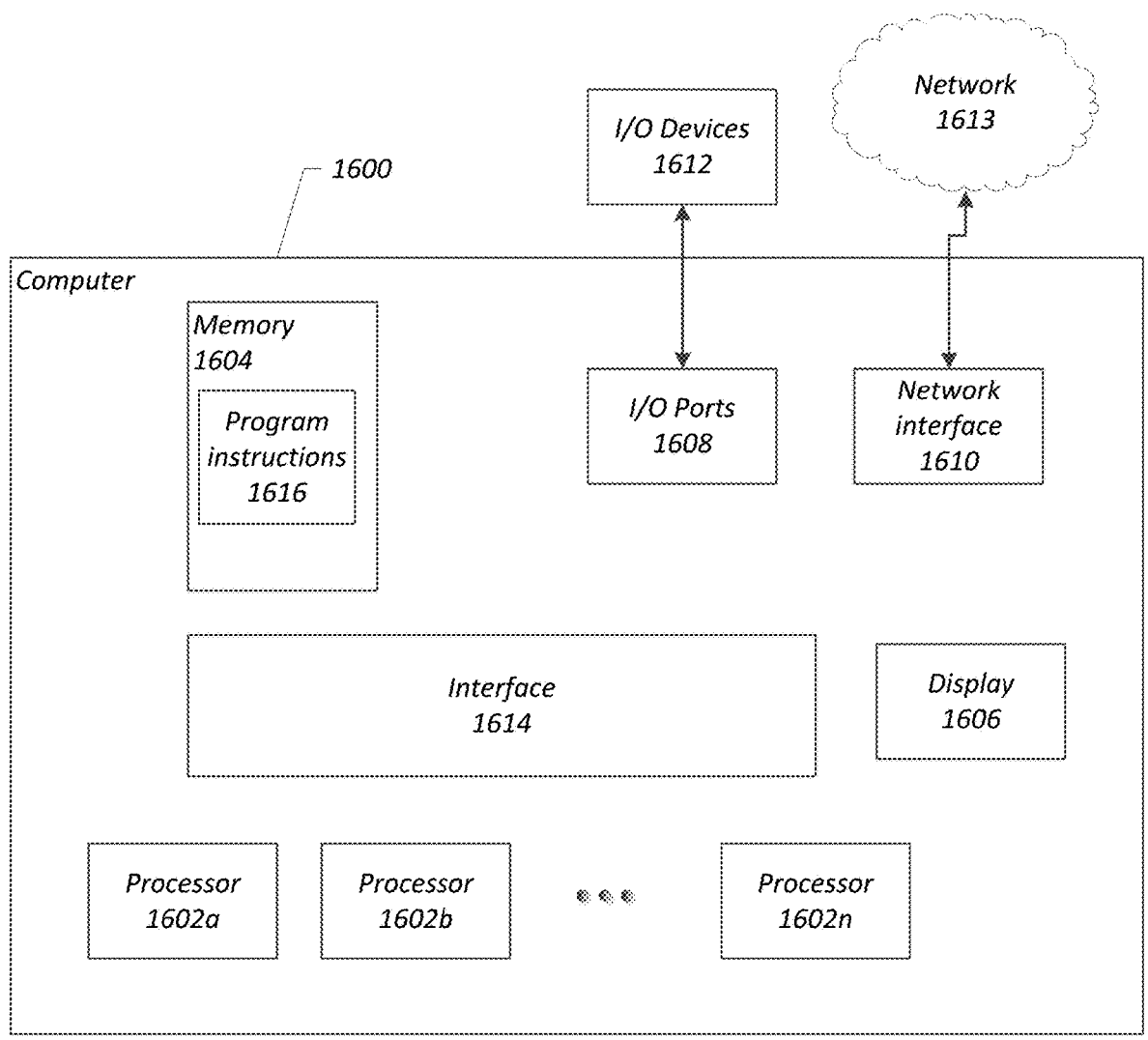
FIG. 16 is a block diagram of a computer in accordance with an embodiment of the present invention.

FIG. 16 depicts a computer 1600 in accordance with an embodiment of the present invention. Various sections of systems and methods described herein may include or be executed on one or more computers similar to computer 1600 and programmed as special-purpose machines by executing some or all steps of methods described above as executable computer code. Further, processes and modules described herein may be executed by one or more processing systems similar to that of computer 1600.

The computer 1600 may include various internal and external components that contribute to the function of the device and which may allow the computer 1600 to function in accordance with the techniques discussed herein. As will be appreciated, various components of computer 1600 may be provided as internal or integral components of the computer 1600 or may be provided as external or connectable components. It should further be noted that FIG. 16 depicts merely one example of a particular implementation and is intended to illustrate the types of components and functionalities that may be present in computer 1600.

Computer 1600 may include any combination of devices or software that may perform or otherwise provide for the performance of the techniques described herein. For example, computer 1600 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. Computer 1600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 1600 may allow a user to connect to and communicate through a network 1613 (e.g., the Internet, a local area network, a wide area network, etc.) and may provide communication over a satellite-based positioning system (e.g., GPS). As shown in FIG. 16, the computer 1600 may include one or more processors (e.g., processors 1602a-1602n) coupled to a memory 1604, a display 1606, I/O ports 1608 and a network interface 1610, via an interface 1614.

In one embodiment, the display 1606 may include a liquid crystal display (LCD) or an organic light emitting diode (OLED) display, although other display technologies may be used in other embodiments. The display 1606 may display a user interface (e.g., a graphical user interface). The display 1606 may also display various function and system indicators to provide feedback to a user. In accordance with some embodiments, the display 1606 may include a "touch screen" and may also be known as or called a touch-sensitive display system.

The processor 1602 may provide the processing capability required to execute the operating system, programs, user interface, and any functions of the computer 1600. The processor 1602 may include one or more processors, such general and special purpose microprocessors, such as ASICs. For example, the processor 1602 may include one or more reduced instruction set (RISC) processors, such as those implementing the Advanced RISC Machine (ARM) instruction set. Additionally, the processor 1602 may include single-core processors and multicore processors and may include graphics processors, video processors, and related chip sets. A processor may receive instructions and data from a memory (e.g., system memory 1604). Accordingly, computer 1600 may be a uni-processor system including one processor (e.g., processor 1602a), or a multi-processor system including any number of suitable processors (e.g., 1602a-1602n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 1604 (which may include tangible non-transitory computer readable storage mediums) may include volatile memory and non-volatile memory accessible by the processor 1602 and other components of the computer 1600. The memory 1604 may store a variety of information and may be used for a variety of purposes. For example, the memory 1604 may store application instructions, such as the firmware for the computer 1600, an operating system for the computer 1600, and any other programs or executable code necessary for the computer 1600 to function. Program instructions 1616 may be executable by a processor (e.g., one or more of processors 1602a-1602n) to implement one or more embodiments of the present techniques. Instructions 1616 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 1604 may be used for buffering or caching during operation of the computer 1600.

As mentioned above, the memory 1604 may include volatile memory, such as random access memory (RAM). The memory 1604 may also include non-volatile memory, such as ROM, flash memory, a hard drive, any other suitable optical, magnetic, or solid-state storage medium, or a combination thereof. The memory 1604 may store data files such as media (e.g., music and video files), software (e.g., for implementing functions on computer 1600), and any other suitable data. The interface 1614 may include multiple interfaces and may couple various components of the computer 1600 to the processor 1602 and memory 1604. In some embodiments, the interface 1614, the processor 1602, memory 1604, and one or more other components of the computer 1600 may be implemented on a single chip, such as a system-on-a-chip (SOC). In other embodiments, these components, their functionalities, or both may be implemented on separate chips. The interface 1614 may be configured to coordinate I/O traffic between processors 1602a-1602n, system memory 1604, network interface 161160, I/O devices 1612, other peripheral devices, or a combination thereof. The interface 1614 may perform protocol, timing or other data transformations to convert data signals from one component (e.g., system memory 1604) into a format suitable for use by another component (e.g., processors 1602a-1602n). The interface 1614 may include support for devices attached through various types of peripheral buses, such as a variant of the Peripheral Component Interconnect (PCI) bus standard or the Universal Serial Bus (USB) standard.

The computer 1600 may also include an input and output port 1608 to allow connection of additional devices. Embodiments of the present invention may include any number of input and output ports 1608, including universal serial bus (USB) ports, Firewire or IEEE-1394 ports, and AC and DC power connectors. Further, the computer 1600 may use the input and output ports to connect to and send or receive data with any other device, such as other portable computers, personal computers, printers, etc. For example, in one embodiment the computer 1600 may connect to a personal computer via a USB connection to send and receive data files, such as applications, media files, etc.

The computer 1600 depicted in FIG. 16 also includes a network interface 1610, such as a wired network interface card (NIC), wireless (e.g., radio frequency) receivers, etc. For example, the network interface 1610 may receive and send electromagnetic signals and communicate with communications networks and other communications devices via the electromagnetic signals. The network interface 1610 may include an antenna system, an RF transceiver, one or more amplifiers, a tuner, one or more oscillators, a digital signal processor, a CODEC chipset, a subscriber identity module (SIM) card, memory, and so forth. The network interface 1610 may communicate with networks (e.g., network 1613), such as the Internet, an intranet, a cellular telephone network, a wireless local area network (LAN), a metropolitan area network (MAN), or other devices by wireless communication.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer 1600 may be transmitted to computer 1600 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

What is claimed is:

1. A non-transitory tangible computer-readable storage medium having executable computer code stored thereon for a workflow interface for generating a near-well unstructured grid, the computer code comprising a set of instructions that causes one or more processors to perform the following:
    define a workflow interface for a near-well unstructured grid builder, the workflow interface configured to:
        define input data for the near-well unstructured grid builder;
        define gridding options for the near-well unstructured grid builder;

display well data of the input data in a 2D or 3D visualization;
provide well data and a region of interest within the input data to an unstructured grid model builder for generation of an unstructured grid;
display geometry of the generated unstructured grid;
display the properties of the generated unstructured grid; and
display the perforation of the generated unstructured grid, wherein the display of the perforation comprises a display of highlighted perforation cells, exit points of the well trajectory for each perforated cell, and entry points of the well trajectory for each perforated cell,
wherein the unstructured grid model builder is configured to:
generate a plurality of grid points; and
performing conflicting point removal and point adjustments to generate a plurality of final grid points based on a point prioritization of weights assigned to the plurality of grid points, the plurality of grid points comprising:
a plurality of field grid points based on a user-specified field grid size; and
a plurality of reservoir grid points based on a user-specified reservoir grid size for each reservoir;
a plurality of well grid points based on a well grid size; and
a plurality of near-wellbore grid points on both sides of each of the plurality of well grid points based on the well grid size.

2. The non-transitory tangible computer-readable storage medium of claim 1, the workflow interface comprising a graphical user interface.

3. The non-transitory tangible computer-readable storage medium of claim 1, the workflow interface configured to display well data of the input data in a 2D or 3D visualization according to user-selected colors.

4. The non-transitory tangible computer-readable storage medium of claim 1, the workflow interface configured to provide a reservoir polygon to an unstructured grid model builder for generation of an unstructured grid, the reservoir polygon comprising the region of interest, wherein the region of interest comprises a user-specified grid size smaller than a reservoir grid size.

* * * * *